(12) United States Patent
Chen

(10) Patent No.: US 7,990,985 B2
(45) Date of Patent: Aug. 2, 2011

(54) BROADBAND COMMUNICATIONS ACCESS DEVICE

(75) Inventor: Steven Chien-Young Chen, Derwood, MD (US)

(73) Assignee: 3E Technologies International, Inc., Rockville, MD (US)

(*) Notice: Subject to any disclaimer, the term of this patent is extended or adjusted under 35 U.S.C. 154(b) by 574 days.

(21) Appl. No.: 12/168,425

(22) Filed: Jul. 7, 2008
(Under 37 CFR 1.47)

(65) Prior Publication Data
US 2009/0036159 A1  Feb. 5, 2009

Related U.S. Application Data

(63) Continuation-in-part of application No. 10/385,057, filed on Mar. 10, 2003, now Pat. No. 7,397,807, which is a continuation of application No. 09/773,103, filed on Jan. 31, 2001, now Pat. No. 7,382,786.

(60) Provisional application No. 60/179,042, filed on Jan. 31, 2000, provisional application No. 60/189,870, filed on Mar. 16, 2000.

(51) Int. Cl.
*H04L 12/28* (2006.01)

(52) U.S. Cl. ................... 370/401; 370/328; 370/352

(58) Field of Classification Search ................. None
See application file for complete search history.

(56) References Cited

U.S. PATENT DOCUMENTS

| | | |
|---|---|---|
| 5,247,347 A | 9/1993 | Litteral |
| 5,408,260 A | 4/1995 | Arnon |
| 5,519,731 A | 5/1996 | Cioffi |
| 5,521,906 A | 5/1996 | Grube |
| 5,557,656 A | 9/1996 | Ray |
| 5,572,575 A | 11/1996 | Yamamoto |
| 5,596,624 A | 1/1997 | Armbruster |
| 5,619,505 A | 4/1997 | Grube |
| 5,627,501 A | 5/1997 | Biran |
| 5,642,348 A | 6/1997 | Barzegar |
| 5,752,162 A | 5/1998 | Sawyer |
| 5,812,930 A | 9/1998 | Zavrel |
| 5,822,374 A | 10/1998 | Levin |
| 5,842,126 A | 11/1998 | Sawyer |
| 5,889,856 A | 3/1999 | O'Toole |
| 5,910,970 A | 6/1999 | Lu |
| 5,911,120 A | 6/1999 | Jarett |
| 5,949,775 A | 9/1999 | Rautiola |
| 5,953,664 A | 9/1999 | Sawyer |
| 5,963,620 A | 10/1999 | Frankel |
| 5,999,518 A | 12/1999 | Nattkemper |
| 6,049,531 A | 4/2000 | Roy |
| 6,157,935 A | 12/2000 | Tran |
| 6,167,120 A | 12/2000 | Kikinis |
| 6,208,637 B1 | 3/2001 | Eames |
| 6,219,409 B1 | 4/2001 | Smith |

(Continued)

OTHER PUBLICATIONS

Partial International Search Report, PCT/US2001/003,177.

*Primary Examiner* — Michael J Moore, Jr.
(74) *Attorney, Agent, or Firm* — Lesavich High-Tech Law Group, P.C.; Stephen Lesavich

(57) ABSTRACT

A broadband communications access device with security features. The broadband communications access devices includes a wireless access point with a wireless interface, wired interface and security interface for providing secure wired and wireless broadband communications access for home entertainment, home security and home energy management devices.

17 Claims, 21 Drawing Sheets

WIRELESS, INTEGRATED PHONE-BASED HOME GATEWAY
INTERFACE HARDWARE ARCHITECTURE

U.S. PATENT DOCUMENTS

| | | |
|---|---|---|
| 6,282,189 B1 | 8/2001 | Eames |
| 6,285,878 B1 | 9/2001 | Lai |
| 6,396,531 B1 | 5/2002 | Gerszberg |
| 6,396,837 B1 | 5/2002 | Wang |
| 6,404,761 B1 | 6/2002 | Snelling |
| 6,405,027 B1 | 6/2002 | Bell |
| 6,418,131 B1 | 7/2002 | Snelling |
| 6,424,636 B1 | 7/2002 | Seazholtz |
| 6,452,923 B1 | 9/2002 | Gerszberg |
| 6,493,875 B1 | 12/2002 | Eames |
| 6,505,255 B1 | 1/2003 | Akatsu |
| 6,506,255 B2 | 1/2003 | Kim |
| 6,526,581 B1 * | 2/2003 | Edson ............................ 725/74 |
| 6,542,465 B1 | 4/2003 | Wang |
| 6,542,500 B1 * | 4/2003 | Gerszberg et al. ............ 370/354 |
| 6,636,505 B1 | 10/2003 | Wang |
| 6,640,239 B1 | 10/2003 | Gidwani |
| 6,640,308 B1 | 10/2003 | Keyghobad |
| 6,650,871 B1 | 11/2003 | Cannon |
| 6,678,215 B1 | 1/2004 | Treyz |
| 6,683,878 B2 | 1/2004 | Christie |
| 6,690,675 B1 | 2/2004 | Kung |
| 6,714,534 B1 | 3/2004 | Gerszberg |
| 6,731,627 B1 | 5/2004 | Gupta |
| 6,731,945 B2 | 5/2004 | Do |
| 6,760,601 B1 | 7/2004 | Suoknuuti |
| 6,909,903 B2 | 6/2005 | Wang |
| 6,990,082 B1 | 1/2006 | Zehavi |
| 7,257,106 B2 | 8/2007 | Chen |
| 7,269,277 B2 | 9/2007 | Davida |
| 7,295,831 B2 | 11/2007 | Coleman |
| 7,336,942 B2 | 2/2008 | Wang |
| 7,382,786 B2 | 6/2008 | Chen |
| 7,394,819 B2 | 7/2008 | Chen |
| 7,397,807 B2 | 7/2008 | Chen |
| 7,516,106 B2 * | 4/2009 | Ehlers et al. ................... 705/412 |
| 7,529,200 B2 | 5/2009 | Schmidt et al. |
| 2001/0030950 A1 | 10/2001 | Chen |
| 2002/0021465 A1 | 2/2002 | Moore |
| 2002/0122061 A1 * | 9/2002 | Martin et al. ................. 345/762 |
| 2003/0169752 A1 | 9/2003 | Chen |
| 2004/0047310 A1 | 3/2004 | Chen |
| 2004/0047358 A1 | 3/2004 | Chen |
| 2005/0149626 A1 | 7/2005 | Manchester |
| 2006/0020960 A1 * | 1/2006 | Relan et al. ..................... 725/30 |
| 2007/0053513 A1 | 3/2007 | Hoffberg |
| 2007/0208864 A1 * | 9/2007 | Flynn et al. ................... 709/227 |
| 2008/0102797 A1 | 5/2008 | Coleman |
| 2010/0194582 A1 * | 8/2010 | Petite ....................... 340/825.52 |
| 2010/0220704 A1 * | 9/2010 | Karaoguz et al. ............. 370/338 |

* cited by examiner

FIG. 3
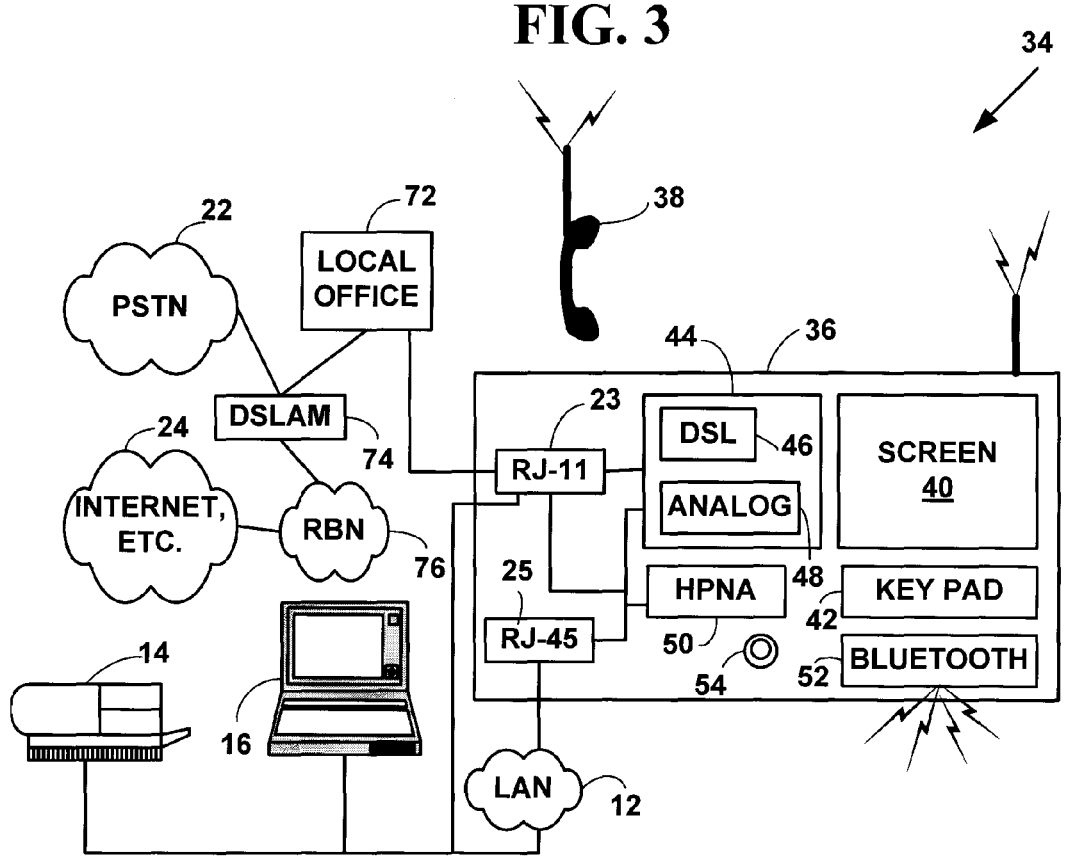
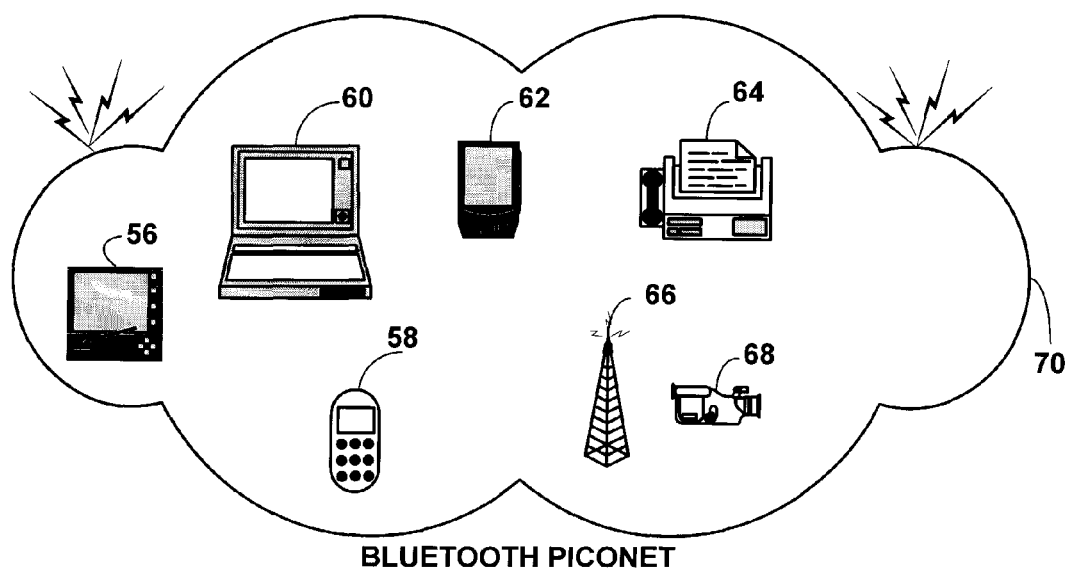
BLUETOOTH PICONET

FIG. 4
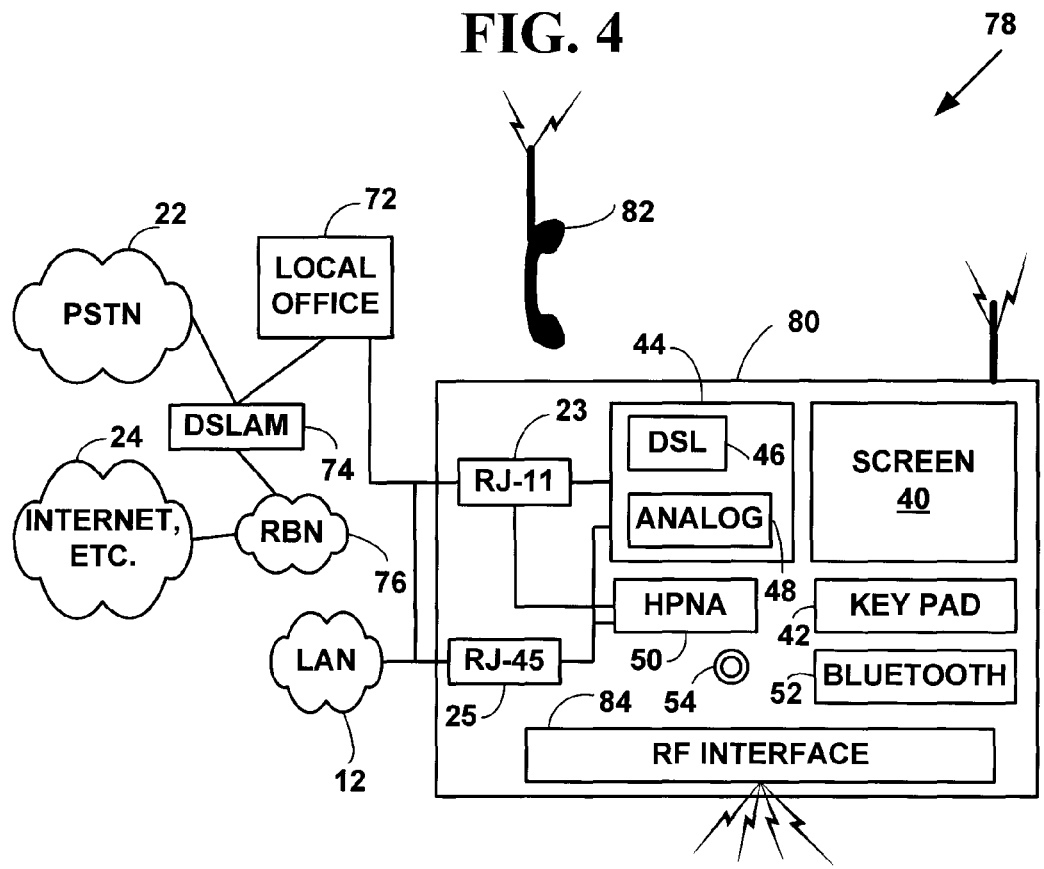
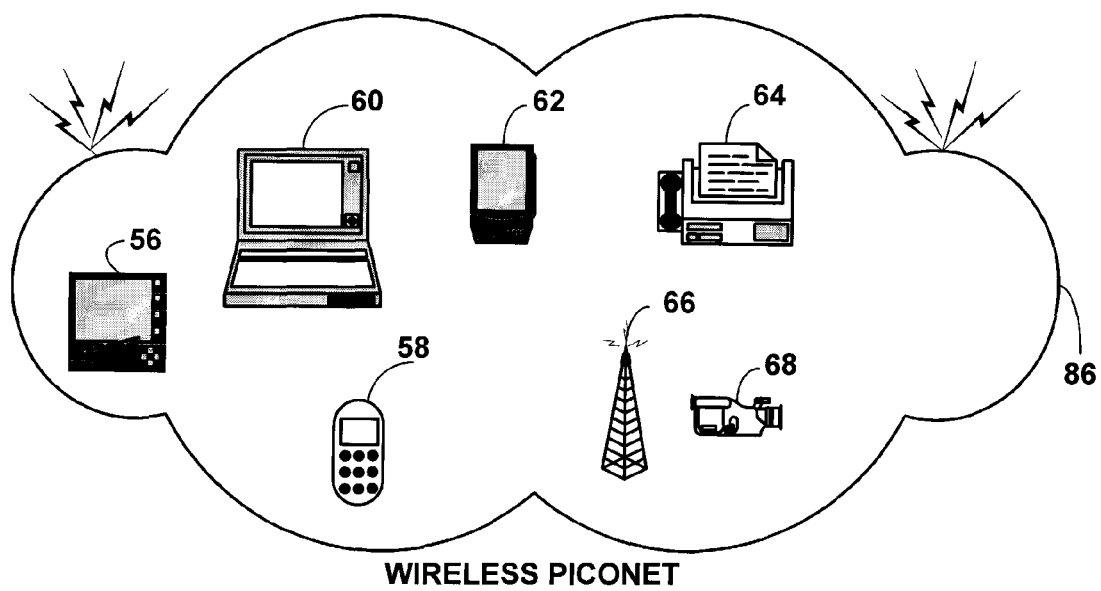
WIRELESS PICONET

INTEGRATED PHONE-BASED HOME GATEWAY INTERFACE
HARDWARE ARCHITECTURE

WIRELESS, INTEGRATED PHONE-BASED HOME GATEWAY
INTERFACE HARDWARE ARCHITECTURE

INTEGRATED PHONE-BASED HOME GATEWAY INTERFACE
SOFTWARE ARCHITECTURE

SESSION MANAGER SOFTWARE ARCHITECTURE

SERVICE MANAGER SOFTWARE ARCHITECTURE

INTERFACE MANAGER SOFTWARE ARCHITECTURE

DISPLAY MANAGER SOFTWARE ARCHITECTURE

WIRELESS ACCESS POINT HARDWARE ARCHITECTURE

SECURE WIRELESS ACCESS POINT ARCHITECTURE

FIG. 17
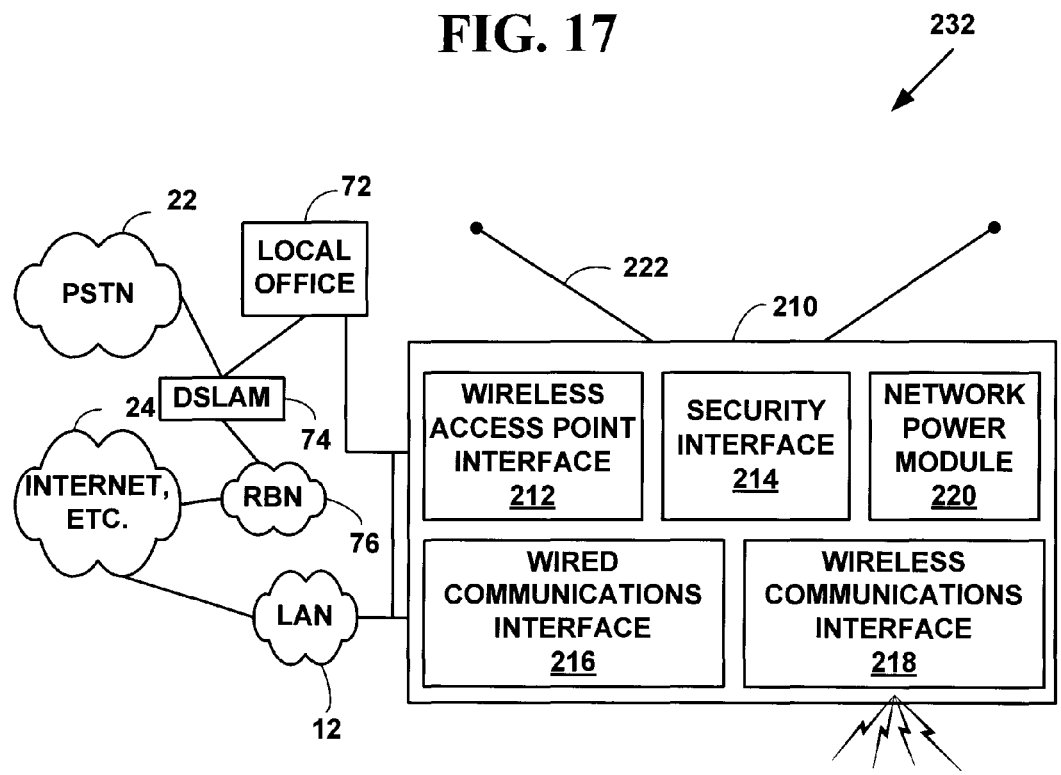
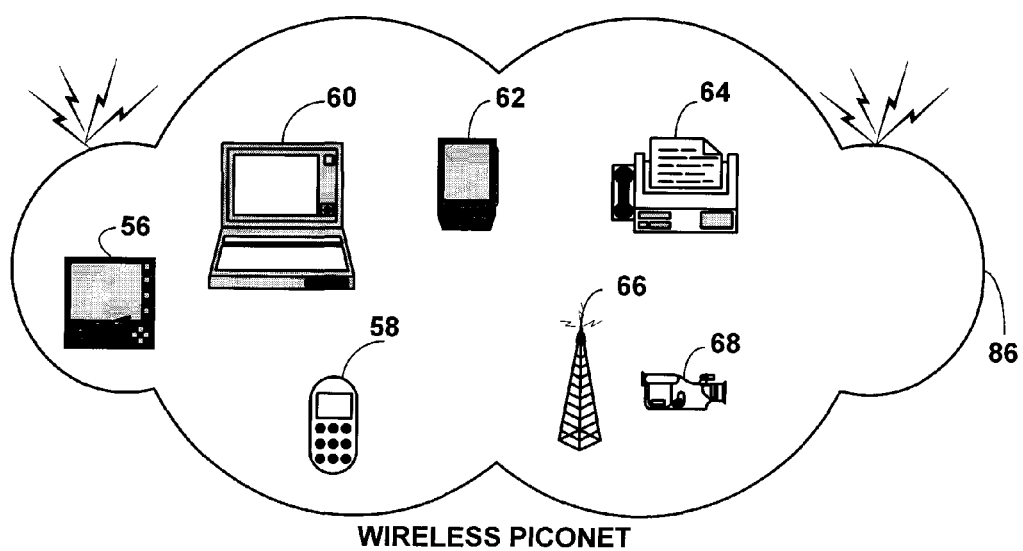
WIRELESS PICONET

INTEGRATED PHONE-BASED
HOME GATEWAY

BROADBAND COMMUNICATIONS ACCESS DEVICE

CROSS REFERENCES TO RELATED APPLICATIONS

This U.S. patent application is a Continuation-In-Part ("CIP") of U.S. application Ser. No. 10/385,057, filed Mar. 21, 2003, now U.S. Pat. No. 7,397,807, that issued on Jul. 8, 2008, which is a continuation of U.S. application Ser. No. 09/773,103 filed on Jan. 31, 2001, now U.S. Pat. No. 7,382,786, that issued on Jun. 3, 2008, both of which claim priority to U.S. Provisional Patent Application Nos. 60/179,042, filed on Jan. 31, 2000, and 60/189,870, filed on Mar. 16, 2000, the contents of all of which are incorporated herein by reference.

FIELD OF THE INVENTION

This invention relates to communications devices. More specifically it relates to wireless broadband communications devices.

BACKGROUND OF THE INVENTION

As is known in the art, broadband communications include communications signals that are typically transmitted over separate inbound and outbound channels. Network devices on a broadband network are connected by copper, coaxial or fiber-optic cable or wireless connections that can carry data, voice, and video simultaneously. Broadband communications are capable of high-speed operation (e.g., megabits-per-second, ("Mbps")).

There are a number of problems associated with providing broadband communications, especially wireless broadband communications. One problem is that broadband communications are operationally complex. Broadband communications typically include a large number of broadband communications parameters that must be configured before a broadband communications application can be used. Service provisioning is also required to use broadband communications. Normally, in the commercial or business environment, trained professionals are required to manage such complexity manually.

Another problem is that it is becoming common for users to have wired and wireless devices for home security, energy management and entertainment that require connections to communications networks like the Internet, intranets, Public Switch Telephone Network (PSTN) and other types of communications networks. Such connections typically require configuring broadband communications parameters and routing tables.

Thus, it is desirable to provide broadband communications device that overcomes the problems described herein and other problems associated with providing broadband communications including wireless broadband communications.

SUMMARY OF THE INVENTION

In accordance with preferred embodiments of the present invention, some of the problems associated with providing broadband communications are overcome. A broadband communications access device is disclosed. The broadband communications access devices includes a wireless access point with a wireless interface, wired interface and security interface for proving secure wired and wireless broadband communications access for entertainment, home security and energy management devices.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a block diagram illustrating an integrated phone-based home gateway system;

FIG. 4 is a block diagram illustrating a wireless, integrated phone-based home gateway system;

FIG. 17 is a block diagram illustrating an integrated secure wireless gateway system in communications with a wireless piconet;

DETAILED DESCRIPTION OF THE INVENTION

Exemplary Phone-Based Home Gateway Systems

Figure 1:
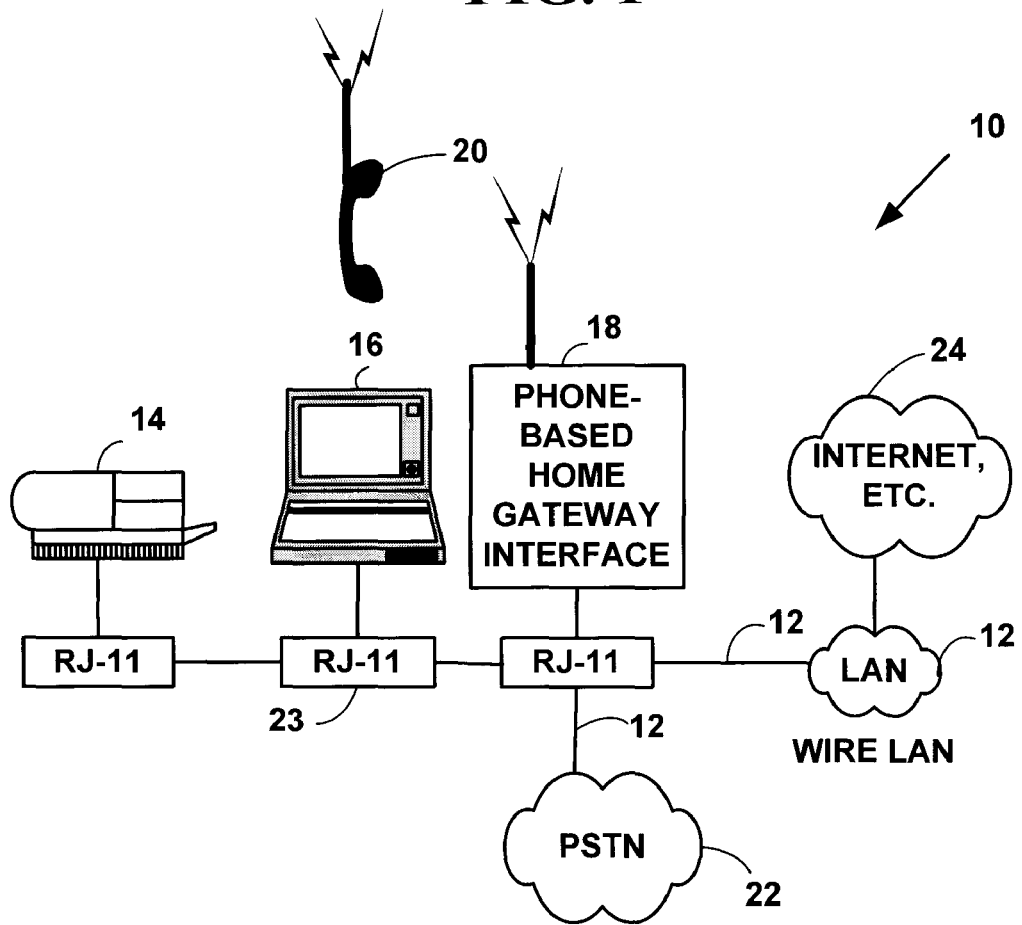
FIG. 1 is a block diagram illustrating an exemplary phone-based home gateway system.

FIG. 1 illustrates an exemplary phone-based home gateway system 10 for one exemplary embodiment of the present invention. As is known in the art, a gateway connects computer networks using different network protocols and/or operating at different transmission capacities. The exemplary phone-based home gateway system 10 includes a local area network ("LAN") 12 with one or more network devices 14, 16, two of which are illustrated, and a phone-based home gateway interface 18 with an optional portable telephony handset 20. If the optional portable telephony 20 handset is not used, the phone-based home gateway interface 18 includes a speaker-phone with a built in microphone and speaker for sending and receiving voice information. The network devices 14, 16 include, but are not limited to, personal computers, printers, personal digital/data assistants ("PDAs"), network appliances and other electronic devices.

The phone-based home gateway interface 18 is connected to a public switched telephone network ("PSTN") 22 via one or more twisted pairs of copper wires, coaxial cable, fiber optic cable, other wired media connections or wired connections to other connection interfaces such as wireless interfaces. In another embodiment, the phone-based home gateway interface 18 includes a wired interface for connecting to selected ones of one or more twisted pairs of copper wires, coaxial cable, fiber optic cable, other wired media connections.

The PSTN 22 is any public switched telephone network provided by AT&T, GTE, Sprint, MCI and others. The phone-based home gateway interface 18 and gateway interface 212 (FIG. 15) may also be connected to other computer networks 24 such as the Internet, an intranet, etc. with wires includes coaxial cable, fiber optic cable other connection media or other connection interfaces such as wireless interfaces. The gateway interface 212 may also be connected to the PSTN 22.

In one embodiment, the phone-based home gateway interface 18 includes a wired interface for connecting to all of broadcast television (TV), cable television (CATV) and high definition (HDTV) and satellite television. In another embodiment, the phone-based home gateway interface 18 includes a wired interface for connecting to selected ones of the television interfaces.

The phone-based home gateway interface 18 and gateway interface 212 may also be connected to other telephony networks via a wireless local loop. The network devices 14, 16 are connected to LAN 12 with RJ-11 interfaces 23. As is known in the art, a Registered Jack-11 ("RJ-11") interface is a four or six-wire connector used primarily to connect network devices to telephony equipment and to local area networks.

The network devices 14, 16 are also connected to LAN 12 with RJ-45 interfaces 25. As is known in the art, a Registered Jack-45 ("RJ-45") interface is an eight-wire connector used commonly to connect devices onto a LAN, including an Ethernets (See, e.g., FIG. 2).

However, the present invention is not limited to such an embodiment and more, fewer or equivalent components can also be used in the phone-based home gateway system 10. In addition, the phone-based home gateway interface 18 is illustrated as separate device from the network devices 14, 16. However, the phone-based home gateway interface 18 may also be an internal component in a network device 14, 16.

Preferred embodiments of the present invention include network devices and home gateway interfaces that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI"), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com."

An operating environment for devices and interfaces of the present invention include a processing system with one or more high speed Central Processing Unit(s) ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for computers exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

The phone-based home gateway interface 18 and the gateway interface 212 allows broadband communications in the megabits-per-second or higher range. The phone-based home gateway interface 18 and gateway interface 212 also provides routing or bridging for networking communications and automatically initializes communications service configurations and provisions communications services.

As is know in the art, a router is an intermediary device on a communications network that expedites message delivery. A router receives transmitted messages and forwards them to their correct destinations over the most efficient available route. A bridge is a device that connects networks using the same communications protocols so that information can be passed from one network device to another.

The phone-based home gateway interface 18 and gateway interface 212 provides gateway functionality between wired LAN 12, PSTN 22, Internet 24 and wireless networks. The phone-based home gateway interface 18 and gateway interface 212 connect these different networks using different network protocols and/or operating at different transmission capacities.

The phone-based home gateway interface 18 and gateway interface 212 also provide routing between a wired LAN 12 and other networks such as the Internet 24 and the PSTN 22. The routing functionality includes network address translation ("NAT"). As is known in the art, NAT is the process of converting between private Internet Protocol ("IP") addresses (e.g., 10.0.0.0) used within an intranet or other private network and public IP addresses (e.g., 216.35.222.250).

The phone-based home gateway interface 18 and gateway interface 212 also provide port address translation ("PAT"). As is known in the art, PAT allows plural devices on a LAN to share one IP address by allocating a unique port address at OSI layer four (i.e., transport layer).

The NAT and PAT functionality allow simultaneous access to the Internet 24 or wireless network for plural wired 14, 16 or wireless network devices. In one embodiment of the invention, NAT and PAT are used in the phone-based home gateway 18 to provide simultaneous access for up to 253 different wired or wireless network devices and can be used to create Virtual Private Networks ("VPNs"). However, the present invention is not limited to such an embodiment and NAT and PAT can be used to provide simultaneous access to more or fewer wired or wireless network devices.

As is known in the art, Point-to-Point Tunneling Protocol (PPTP) is a tunneling protocol developed by Ascend Communications, ECI Telecom, Microsoft, and U.S. Robotics that encapsulates Point-to-Point (PPP) frames over Transmission Control Protocol ("TCP")/IP networks. The phone-based home gateway interface 18 also provides PPTP for tunneling (e.g., in VPNs).

The phone-based home gateway interface 18 and gateway interface 212 also provide Dynamic Host Configuration Protocol ("DHCP") functionality. As is known in the art, DHCP is a protocol for dynamically allocating IP addresses and passing configuration information to hosts on an IP network. For more information on the DHCP see, IETF Request For Comments ("RFC")-1541, and RFC-2131, incorporated herein by reference. The DHCP functionality includes both DHCP client and DHCP server functionality.

The phone-based home gateway interface 18 and gateway interface 212 also provide bridging between wired networks (e.g., Ethernet LANs) and wireless networks. In one embodiment of the invention, the bridging is completed at the OSI data-link layer and the bridging includes bridging Media Access Control ("MAC") and/or Logical Link Control ("LLC") communications protocols.

The phone-based home gateway interface 18 and gateway interface 212 may be connected to the PSTN 22 via one or more high-speed telephony interfaces to provide broadband communications, and/or one or more low-speed telephony interfaces to provide other telephony communications. The phone-based home gateway interface 18 and gateway interface 212 may also connected to the Internet 24, or other computer network via one or more data interfaces, such as IP interfaces to provide data communications. Voice communications can also be provided via the Internet and other computer networks using Voice over IP ("VoIP").

As is known in the art, IP is a routing protocol designed to route traffic within a network or between networks. IP is described in IETF RFC-791, incorporated herein by reference. However, the present invention is not limited to IP data interfaces and other data interfaces can also be used.

VoIP is a set of facilities for managing the delivery of voice information using IP packets. In general, VoIP is used to send voice information in digital form in discrete data packets (i.e., IP packets) over data networks 24 rather than using traditional circuit-switched protocols used on the PSTN 22. VoIP is used on both wireless and wired data networks.

VoIP typically comprises several applications (e.g., SIP, SLP, H.323, H.324, DNS, AAA, etc.) that convert a voice signal into a stream of packets (e.g., IP packets) on a packet network and back again. VoIP allows voice signals to travel over a stream of data packets.

As is known in the art, SIP supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543, the contents of which are incorporated herein by reference.

As is known in the art, SLP provides a scalable framework for the discovery and selection of network services. Using SLP, network devices using the Internet need little or no static configuration of network services for network based applications. For more information on SLP see IETF RFC-2608, incorporated herein by reference.

As is known in the art, H.323 is one of main family of video conferencing recommendations for IP networks. The ITU-T H.323 standards entitled "Packet-based multimedia communications systems" dated 02/98, 09/99, 11/00 and 07/03 are incorporated herein by reference. As is known in the art, H.324 is a video conferencing recommendation using POTS lines. The ITU-T H.324 standards entitled "Terminal for low bit-rate multimedia communication" dated 02/98 and 03/02 are incorporated herein by reference.

As is known in the art, a Domain Name System ("DNS") provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting ("AAA") includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN 22. Thus, VoIP is typically used with the H.323 protocol and other multimedia protocols. H.323 terminals such as multimedia computers, handheld devices, PDAs or other devices such as mobile phones connect to existing wired and wireless PSTN as well as private wired and wireless networks.

H.323 terminals are typically LAN-based end points for voice transmission. H.323 terminals typically support real-time, two-way voice communications. H.323 terminals implement voice transmission functions and typically include at least one voice coder/decoder ("CODEC") that sends and receives packetized voice (e.g., ITU-T CODECS, G.711, G.723, G.726, G.728, G.729, etc.).

The phone-based home gateway interface 18 allows multiple home users to access the Internet, other computer networks and content services for conducting e-commerce, receiving content news, entertaining on-demand, making audio or video communications, and telecommuting or working at home. This phone-based home gateway interface 18 allows in-home as well as to-home networking and allows resource sharing among home devices via the existing phone wire, wireless, coaxial or optical cable connections.

Figure 2:
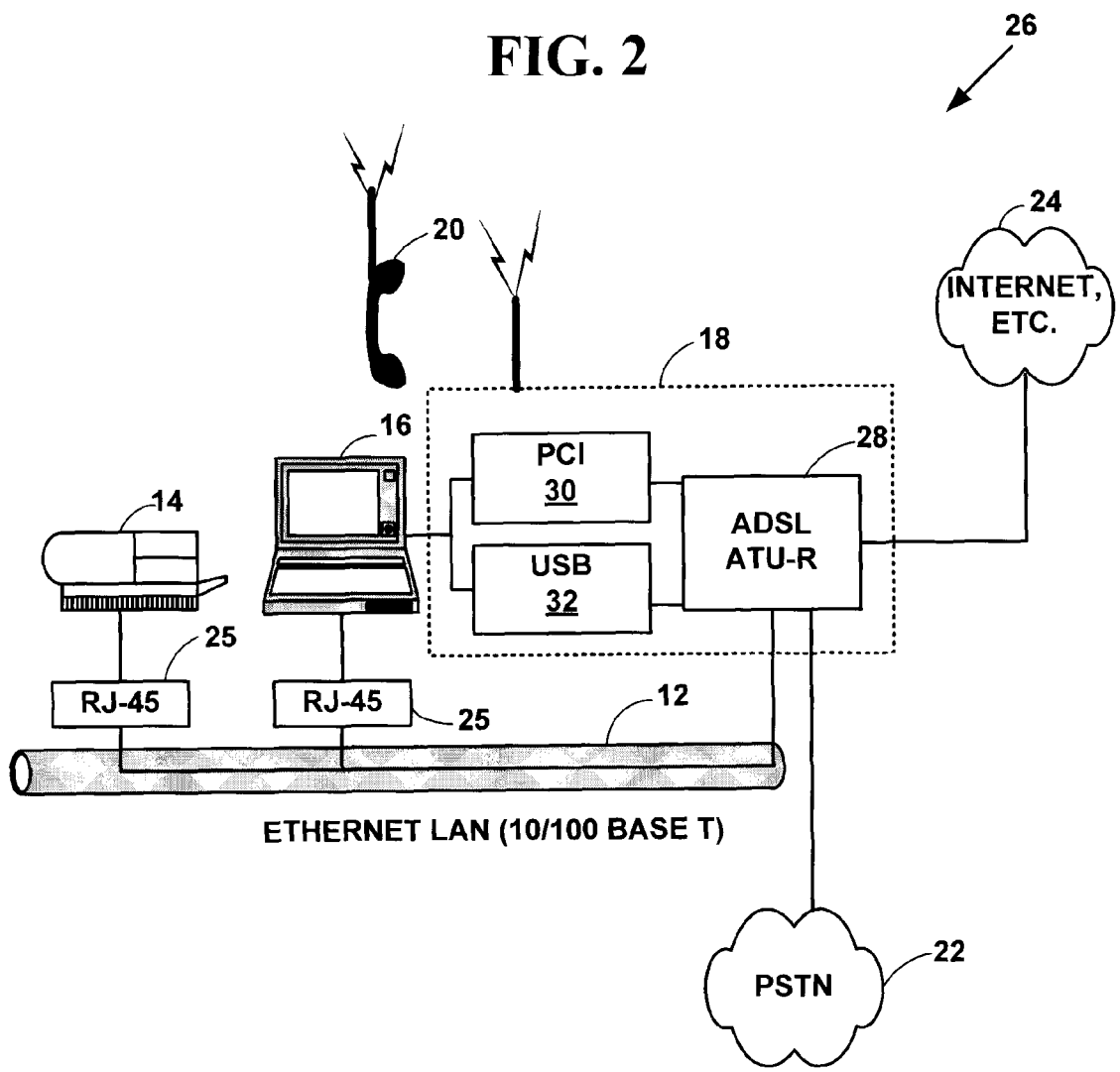
FIG. 2 is a block diagram illustrating an ADSL component of a phone-based home gateway system.

FIG. 2 is a block diagram 26 illustrating an Asymmetric Digital Subscriber Line ("ADSL") component 28 of the phone-based home gateway interface 18. The ADSL component 28 is illustrated as integral to the phone-based home gateway interface 18. However, the ADSL component 28 can also be an external or separate component of the phone-based home gateway interface 18.

As is known in the art, ADSL is a communications technology that transmits an asymmetric data stream over a conventional twisted pair of copper telephone wires. An ADSL typically transmits a larger data rate downstream to a subscriber from a telephony switching office than from a subscriber back to the telephony switching office. ADSLs typically transmit about 1.5 Mega bits-per-second ("Mbps") to about 9 Mbps downstream to a subscriber, and about 16 kilo-bps ("kbps") to 640 kbps upstream back to a telephony switching office.

However, the phone-based home gateway interface 18 may also include a symmetric, other or equivalent communications component and the present invention is not limited to the ADSL component 28. The ADSL component 28 allows the phone-based home gateway interface 18 to be used to provide broadband, or other faster transmission rates than can be obtained with analog modems over a conventional telephone wire.

An ADSL system typically comprises two asymmetric devices connected by a conventional twisted pair of copper wires. An ADSL Transmission Unit-Central ("ATU-C") is a device at one end of an ADSL connection at a telephony or other switching office on the PSTN 22 or other network. An ADSL Transmission Unit-Remote ("ATU-R") is a device at another end of an ADSL connection at a subscriber or customer site. The ADSL connection can be used either with or without a splitter.

Returning to FIG. 2, the phone-based home gateway interface 18 includes an ADSL terminating unit (ATU-R) 28 that is used to connect the phone-based home gateway interface 18 to the LAN 12.

In another embodiment of the present invention, the LAN 12 can also include a 10/100 Base-T Ethernet LAN as is illustrated in FIG. 2. As is known in the art, 10/100 Base-T is an Ethernet standard for LANs using twisted-pair cable transmitting at 10 to 100 Mbps. However, the present invention is not limited to such an embodiment, and other or equivalent LANs can also be used. The IEEE Ethernet standard 802.3af-2003 is incorporated herein by reference. The ATU-R 28 is also used to connect to network devices 14, 16 to the PSTN 22 via a peripheral component interconnect ("PCI") 30 bus or a Universal Serial Bus ("USB") 32 connection.

As is know in the art, a PCI is a local bus standard. Most modern computers include a PCI bus 30. PCI is a 64-bit bus, though it is usually implemented as a 32-bit bus. As is known in the art, a USB 32 is an external bus standard that supports data transfer rates of up to 12 Mbps or higher. A single USB port can be used to connect up to 127 peripheral devices such as mice, modems, and keyboards. USB also supports plug-and-play installation and hot plugging. Plug-and-play refers to the ability of a computer system to automatically configure expansion boards and other devices without worrying about setting DIP switches, jumpers and other hardware and software configuration elements.

Exemplary Integrated Phone-Based Home Gateway System

FIG. 3 is a block diagram illustrating an integrated phone-based home gateway system 34. The integrated phone-based home gateway system 34 includes an integrated, phone-based home gateway interface 36 with an optional portable wireless handset 38, a display screen 40, a key pad 42, a communications interface 44 including a DSL component 46 and an analog component 48, a home phoneline network adapter ("HPNA") component 50, a Bluetooth component 52, and an optional video camera component 54. The integrated phone-based home gateway system 34 also includes one or more processors, one more banks of memory and one or more software modules (not illustrated in FIG. 3). However, the present invention is not limited to such an embodiment and more, fewer or equivalent components can also be used in the integrated phone-based home gateway system 34. The integrated phone-based home gateway system 34 provides "in-home" as well as "to-home" networking for voice, video and data.

The integrated, phone-based home gateway interface 36 may include one or more physical buttons or controls for selecting features of a base station. One or more graphical buttons or controls may also be included on the display screen 40. The integrated, phone-based home gateway interface 36 is modular and allows the components described above and other or equivalent types of components to be easily interchanged.

The integrated, phone-based home gateway interface 36 may include an optional portable wireless telephone handset 38 that allows a user to use the handset 38 in the vicinity of the integrated, phone-based home gateway interface 36. In one embodiment of the present invention, the handset 38 is a 4-in-1 phone set including a cordless phone, mobile phone, web-phone (e.g., for Voice over IP ("VoIP")) and walkie-takie radio capabilities. However, the present invention is not limited to such an embodiment and other or equivalent handsets can also be used. In addition, the handset 38 can also provide only one, two or three of the 4-in-1 phone set capabilities.

In one embodiment of the invention, the integrated, phone-based home gateway interface 36 includes four RJ-45 jacks 25 that provide access to a four-port 10/100 Mbps switch. This embodiment also provides one RJ-45 jack for a broadband connection via a DSL 46 or a cable modem and one RJ-11 jack for a narrowband connection (e.g., POTS). However, the invention is not limited to this embodiment and other combinations of RJ-45, RJ-11 can also be used, with or without a 10/100 Mbps switch.

If the optional portable wireless handset 38 is not used, the communications interface 44 may include a speaker-phone with a built in microphone and speaker for sending and receiving voice information. The communications interface 44 may include a speaker-phone whether or not the portable wireless handset 38 is used.

The integrated, phone-based home gateway interface 36 also provides routing or bridging for networking communications, including voice, video and data communications and coordinates establishing, initializing and provisioning broadband, narrow-band and data communications parameters and channels. Service provisioning includes automatically allocating, configuring and maintaining multiple transmission channels and virtual communications paths used for broadband communications. In one embodiment of the present invention, this functionality is provided in integrated, phone-based home gateway interface 36 with software modules illustrated in FIGS. 7-11. However, the present invention is not limited to such an embodiment, and this functionality can also be provided in firmware, hardware, or software, or any combination thereof.

The display screen 40 includes a conventional computer display screen, a liquid crystal display screen with color, black and white or grey scale capabilities, or other types of display screens, including touch screens. The display screen 40 is used to display and access voice, video, data and other Internet messages (e.g., e-mail). In one embodiment of the present invention, the display screen 40 is a removable module that can be used as portable wireless hand-held device (e.g., infra-red, Bluetooth, other wireless, etc.) in the vicinity of the integrated, phone-based, home gateway interface 36. In one embodiment of the present invention, the display screen 40 is used to display at least one line of real-time stock quote, weather, headline news, community news, electronic address, or other information from the Internet 24. The optional video camera component 54 is used to collect and send data for video conference calls, video e-mail, etc.

The keypad 42 includes a telephone key pad, other numeric keypad, an alpha-numeric keypad, other specialized key pad, a keyboard, or other alpha-numeric data entry device. The keypad 42 can include physical devices as well as graphical representations of key pads that are made available on the display screen 40.

The communications interface 44 includes a DSL component 46 and an analog component 48. The DSL component 46 provides broadband communications. The DSL component 46 may include a DSL device with one of the following interfaces: ADSL, symmetric DSL ("SDSL"), high-bit-rate DSL ("HDSL") or very-high-bit-rate ("VDSL"). The DSL component 46 is integrated inside a phone set, which provides conventional telephony as well as an always-on connectivity to broadband networks, the Internet or other computer networks. The analog component 48 may include analog modems, such as a V.90 56 kbps or other analog modems operating at a different speed or using a different communication protocol than the DSL component 46. In one embodiment of the present invention, the analog component 48 includes using plain old telephone service ("POTS"), and is also integrated inside a phone set for the purpose of providing channel redundancy, broadband service provisioning and configuration.

In one embodiment of the present invention, the communications interface 44 is connected to a POTS splitter that allows the DSL component 46 and the analog component 48 to use the same twisted pairs of telephone lines (See FIG. 6). The POTS splitter may also be used to provide broadband as well as other higher-bandwidth services (e.g., Asynchronous Transport Mode ("ATM"), Optical transmission, Integrated Services Digital Network, ("ISDN"), Frame Relay, etc.) and lower-bandwidth services (e.g., POTS).

The HPNA component 50 provides a convenient and flexible way to interconnect computers and peripherals to a network, including plug-and-play. The HPNA component 50 also enables existing telephone wiring to be used for broadband network access. In addition, HPNAs enable VoIP phones that have Ethernet connectors to interface with non-Ethernet broadband connections. FIG. 3 illustrates network devices 14, 16, comprising a small home network connected to the HPNA 50 via RJ-11 interfaces 23 and RJ-45 interfaces 25. However, the present invention is not limited to such an embodiment. In addition, the network devices 14, 16 can also be connected using PCI 30 or USB 32 connections (FIG. 2) as was described above.

The Bluetooth component 52 simplifies data synchronization and transmission between network devices and the LAN 12 with a common short-range wireless protocol. As is known in the art, Bluetooth is a short-range radio frequency technology aimed at simplifying communications among network devices and between network devices. Bluetooth wireless technology supports both short-range point-to-point and point-to-multipoint connections. The Bluetooth specification, version 1.0, 1999, is incorporated herein by reference. In another embodiment of the present invention, the Bluetooth component can be replaced with virtually any other short-range radio interface component.

In one embodiment of the present invention, wired and wireless home electronic or other electronic devices, such as a WEB pad 56, a mobile phone 58, a lap top or notebook computer, a desk top personal computer 60, a PDA 62, smart appliances 64, alarm systems 66, home video monitoring equipment 68, etc. may interface with the integrated phone-based home gateway interface 36 through modular interfaces (e.g., RJ-11, RJ-45 or HPNA interfaces) or Bluetooth wireless interfaces. The wireless devices are connected to the integrated phone-based home gateway interface 36 over a Bluetooth piconet 70 or Bluetooth scatternet using the Bluetooth component 52.

As is known in the art, a "piconet" is a network in which "slave" devices can be set to communicate with a "master" radio controller in one device such as a gateway. Piconet are typically limited to a certain range and vicinity in which wireless devices must be present to operate (e.g., a few feet up to few miles away from the master radio controller). Several "piconets" can be established and linked together in "scatternets" to allow communication among several networks providing continually flexible configurations.

In one embodiment of the present invention, the communications interface 44 is connected to a local switching office 72 on the PSTN 22 via a RJ-11 jack 24. The RJ-11 jack 24 provides narrow band (e.g., voice) and broadband communications and data communications via the PSTN 22 and Internet 24. The local switching office 72 is connected to a digital subscriber line access multiplexer ("DSLAM") 74, which is in turn in communications with other telephony equipment via the PSTN 22. As is known in the art, a DSLAM concentrates individual voice lines to T1 lines, wireless antenna sites, Private Branch Exchanges ("PBXs"), Optical Network Units ("ONUs") or other carrier systems. The DSLAM 74 may also be connected to a regional broadband network ("RBN") 76, or other broadband or narrow-band voice, video or data networks which in turn may be communications with other networking equipment on the Internet 24.

The integrated phone-based home gateway system 34 provides gateway functionality, broadband communications as well as normal voice telephony to the home environment. The integrated, phone-based home gateway interface 36 is a modular, flexible home network appliance, as well as broadband or narrow-band telephony and data communications device that provides in-home as well as to-home networking.

Exemplary Wireless Integrated Phone-Based Home Gateway System

FIG. 4 is a block diagram illustrating a wireless, integrated phone-based home gateway system 78. In such an embodiment, the wireless, integrated phone-based home gateway system 78 is typically not connected directly to any other network device with any wires. In one embodiment of the present invention, all connection are wireless, including those to the PSTN 22 and the Internet 24. In another embodiment of the present invention, all connections to network devices are wireless, however, connections to the PSTN 22 and/or the Internet 24 may be with wires as is illustrated in FIG. 4. However, the present invention is not limited to such embodiments and the wireless, integrated, phone-based home gateway system 78 can also be used with a variety of other connection options.

The wireless, integrated, phone-based home gateway system 78 includes a wireless, integrated phone-based home gateway interface 80 and optional portable wireless telephone handset 82. The wireless, integrated phone-based home gateway interface 80 includes the same components as the integrated phone-based home gateway interface 36 described above for FIG. 3. In addition, the wireless phone-based home gateway interface 80 includes an additional plug-in radio frequency ("RF") interface 84.

In one embodiment of the present invention, the RF interface 84 includes but is not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN) or "RF Home" wireless interfaces. In another embodiment of the present invention, the RF interface 84 may include an integral or separate Bluetooth 52 and/or infra data association ("IrDA") module for wireless Bluetooth or wireless infrared communications. (not illustrated). However, the present invention is not limited to such an embodiment and other 802.11xx and other types wireless interfaces can also be used.

As is known in the art, an 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11 xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. More information on WiMAX can be found at the URL "www.wimaxforum.org." WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org." ETSI HIPERMAN can be used to provide a WLP.

In one embodiment of the present invention, the wireless, integrated phone-based home gateway interface 80 includes an X10 module 117 plugged into an alternating current ("AC") power source. As is known in the art, X10 a protocol for controlling electrical devices via existing electrical AC power line wiring. X10 devices communicate between transmitters and receivers by sending and receiving signals over power line wiring. These signals involve short RF bursts which represent digital information. X10 functionality is described in part in U.S. Pat. Nos. 4,200,862, and 4,638,299, now expired. The X10 protocol document entitled "Standard and Extended X-10 Code Formats," September 1993, XTC797, is incorporated herein by reference. More information about X10 can be found at the URL "www.x10.com."

As is known in the art, RF Home is a standard for wireless networking access devices to both local content and the Internet for voice, data and streaming media in home environments. More information on RF Home can be found at the URL "www.homerf.org."

RF Home includes the Shared Wireless Access Protocol ("SWAP"). The SWAP specification defines a new common interface protocol that supports wireless voice and data networking in the home. The RF Home SWAP protocol specification, March 1998, is incorporated herein, by reference.

In one embodiment of the present invention, the RF interface 84 and high-speed wireless interface 107 is a short-range RF interface that is capable of communicating with wireless devices over a wireless piconet 86 or wireless scatternet using wireless communications protocols.

In another embodiment of the present invention, the RF interface 84 and high-speed wireless interface 107 is a long-range radio interface (e.g., WAP interface) used for communicating with wireless devices on wireless networks outside the range of a wireless piconet 80.

In yet another embodiment of the present invention, the RF interface 84 and high-speed wireless interface 107 includes both short-range and long-range RF interfaces. However, the RF interface 84 and high-speed wireless interface 107 can be virtually any other or equivalent short-range or long-range RF interface and the present invention is not limited to the short-range or long-range RF interfaces described.

Figure 5:
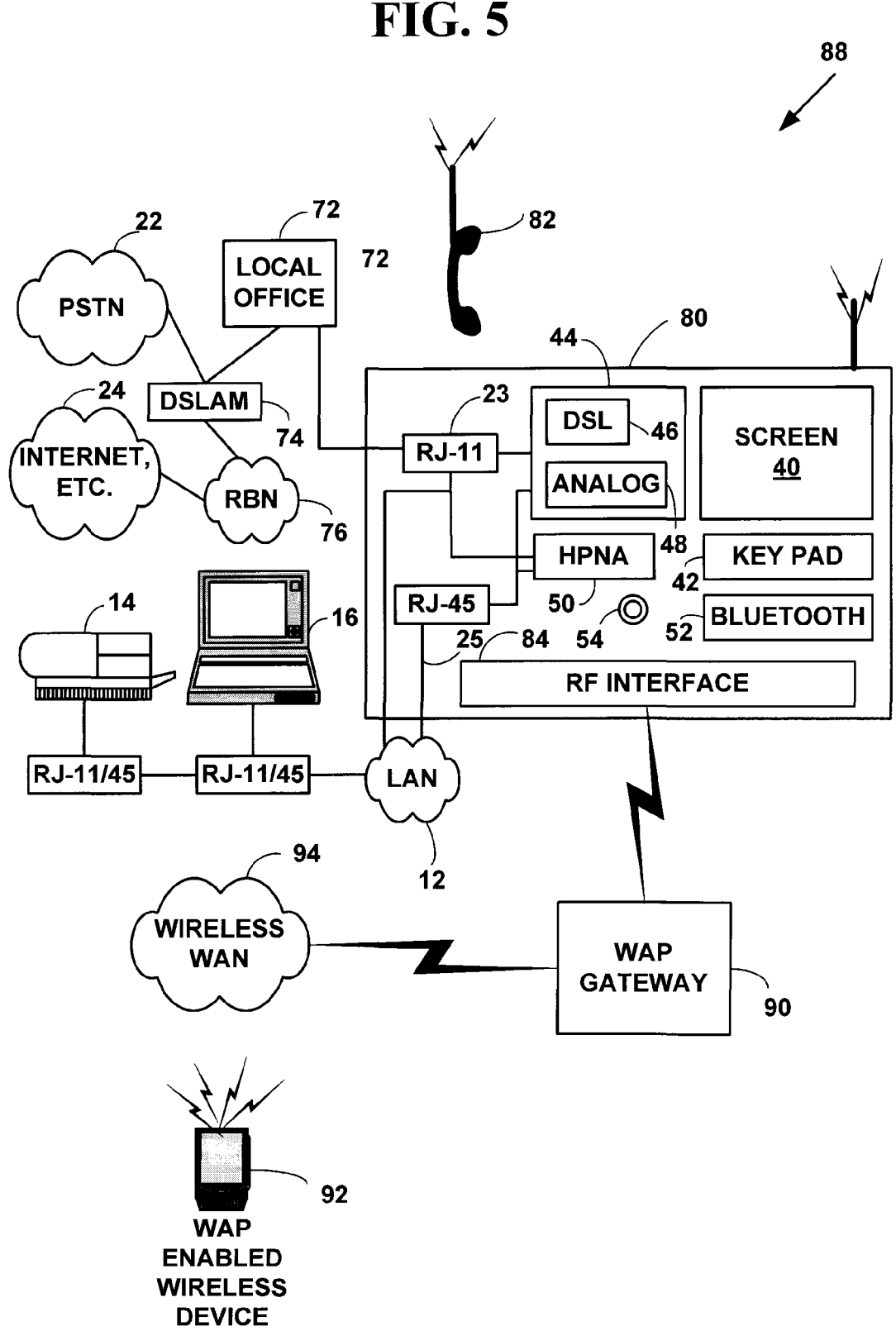
FIG. 5 is a block diagram illustrating to-home wireless networking with the wireless, integrated phone-based home gateway system of FIG. 4.

FIG. 5 is a block diagram illustrating "to-home" wireless networking 88 with the phone-based, integrated, wireless phone-based home gateway system 78. The wireless, integrated, phone-based home gateway system 78 can be used to provide long range to-home wireless networking as well as long range in-home wireless networking with wireless protocols.

For example, the wireless, integrated, phone-based home gateway interface 80 can be in communications with a WAP gateway 90 to provide long-range to-home wireless networking at the wireless, integrated phone-based home gateway interface 80 from a WAP enabled devices 92 or other long-range wireless devices via a wireless wide-area network ("WAN") 94. The "Wireless Application Protocol Architecture Specification", by the Wireless Application Protocol Forum, WAP-100-WAPArch-1998-0430-a, April 1998, is incorporated herein by reference. The wireless wide-area network 88 allows devices outside a certain range and vicinity (e.g., greater than a few miles and/or outside the range of a piconet) to be in communications with the wireless, integrated phone-based home gateway interface 80.

The wireless, integrated phone-based home gateway system 78 provides gateway functionality, broadband communications, short-range and/or long-range wireless communications, as well as normal voice telephony to the home environment. The wireless, integrated, phone-based home gateway interface 80 is a modular, flexible home network appliance, as well as broadband telephony and data communications device that provides short-range and long-range wireless in-home as well as to-home networking.

In one embodiment, the wireless interface 107 of the integrated phone-based home gateway system 100' includes all of the wireless interfaces described above. In another embodiment, the wireless interface 107 of the integrated phone-based home gateway system 100' includes only selected ones of the wireless interfaces described above.

Exemplary Integrated Phone-Based Home Gateway System Hardware Architecture

Figure 6A:
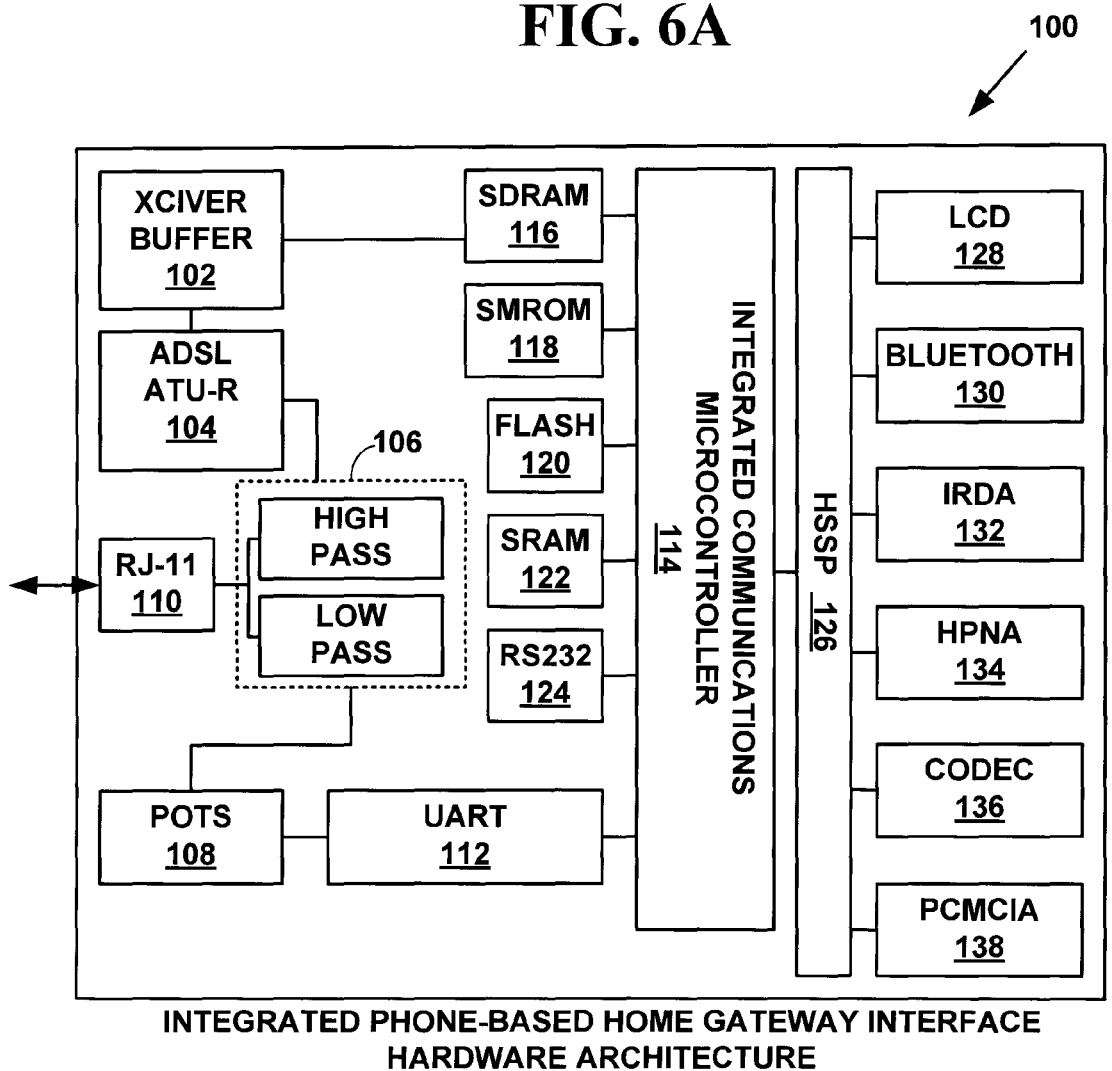
FIG. 6A is a block diagram illustrating an exemplary integrated phone-based home gateway interface architecture.
Figure 6B:
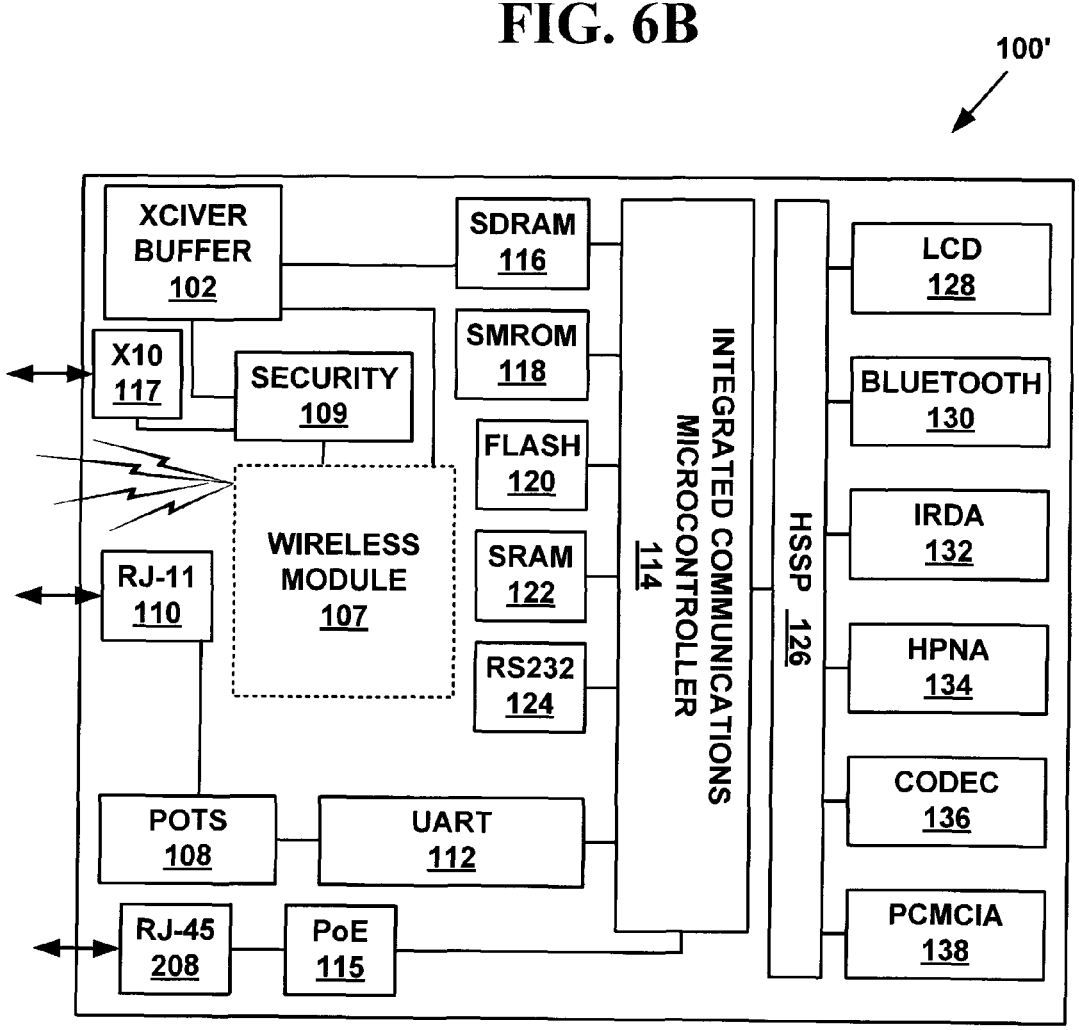
FIG. 6B is a block diagram illustrating an exemplary wireless, integrated phone-based home gateway interface architecture.

FIG. 6A is a block diagram illustrating an exemplary integrated phone-based home gateway interface hardware architecture 100. FIG. 6B is a block diagram illustrating an exemplary wireless, integrated phone-based home gateway interface hardware architecture 100'. The exemplary phone-based home gateway interface architecture 100 illustrated in FIG. 6A is used with the integrated phone-based home gateway interface 36 (FIG. 3). The exemplary wireless, integrated phone-based home gateway interface hardware architecture 100' is used with the wireless, integrated phone-based home gateway interface 80 (FIG. 4).

The exemplary integrated phone-based home gateway interface architecture 100 includes a receive and transmit or transceiver ("XCIVER") buffer 102, an ADSL ATU-R 104, a splitter 106 including a high-pass filter and a low pass filter, a POTS telephone module 108, an RJ-11 interface 110 and a RJ-45 interface 111. An expansion header (not illustrated) may also be used between the ATU-R 104 and the XCIVER buffer 102.

The POTS telephone module 108 may include an analog V.90 56K modem, other analog or digital modem and/or a 900 MHz-2.4 GHz cordless phone module (Not illustrated in FIG. 6A). The POTS telephone module 108 is connected to a universal asynchronous receiver-transmitter ("UART") 112, which is turn connected to an integrated communications micro-controller 114.

An ADSL system typically includes one or more splitters 106. The splitter 106 is a filter that separates high frequency and low frequency telephony signals. A splitter may be integrated the ATU-R 104, physically separated from ATU-R 104, and may be divided between high pass and low pass functionality as is illustrated in FIG. 6A.

In one exemplary preferred embodiment of the present invention, the ADSL ATU-R 104 is used with the splitter 106 and is compliant with the ANSI standard "Network and Customer Installation Interfaces—Asymmetric Digital Subscriber Line (ADSL) Metallic interface," ANSI-T1.413-1995, and the ITU standards "Asymmetrical digital subscriber line (ADSL) transceiver," ITU-G.992.1-1999, the contents of which are incorporated herein by reference.

In another exemplary preferred embodiment of the present invention, the ADSL ATU-R 104 is used without splitter 106. A splitterless ADSL system typically delivers a maximum downstream bandwidth of about 1.4 Mbps, but is less sensitive to noise and other transmission problems typically encountered by ADSL system that use splitters. The splitterless ADSL standard is called "G.lite." In such a splitterless embodiment, the ADSL ATU-R 104 is compliant with the ANSI-T1.413-1995 standard and the ITU-T "Splitterless Asymmetrical Digital Subscriber Line Transceivers," ITU-G.992.2-1999, the contents of which are incorporated herein by reference.

In one embodiment of the present invention, the ADSL ATU-R 104, either with or without splitter 106 is used with a high-speed wireless interface 107. In another embodiment of the present invention, the ADSL ATU-R 104 are splitter 106 are replaced with the high-speed wireless interface 107 as is illustrated in FIG. 6B.

This high-speed wireless interface 107 provides a "wireless local loop" ("WLP") for use in wireless, integrated, phone-based home gateway interface 80 (FIG. 4), to provide in-home and as well as to-home wireless networking. The high-speed wireless interface 107 also provides a high-speed wireless interface for wireless networking outside the home environment (e.g., military, commercial, educational, etc.) The high-speed wireless interface 107 also provides a "wireless access point." The high-speed wireless interface 107 also provides dual operation as both a wireless gateway or a wireless access point.

In one embodiment of the present invention, wireless, integrated phone-based home gateway interface hardware architecture 100' for the wireless, integrated phone-based home gateway interface 80 also incorporates a Power over the Ethernet ("PoE") or "Active Ethernet" module 115. A PoE device obtains direct current ("DC") voltage via unused wires in a standard Ethernet cable (e.g., pairs 4-5 and 7-8) and eliminates the need for AC power outlets or other DC power sources at the devices's physical location (e.g., on a military vehicle such as a Army tank, Navy ship, etc. on a roof, etc.). PoE allows greater flexibility in the locating of wireless, integrated phone-based home gateway interface 80 when it is used as a wireless access point.

In another embodiment of the present invention, the integrated, phone-based home gateway accepts injected DC power directly from the Ethernet cable through the RJ-45 jack. Such an embodiment is considered to be "PoE-Compatible" or "Active Ethernet Compatible".

In another embodiment of the present invention, the integrated, phone-based home gateway includes an alternating current (AC) power module, including but not limited to, a 110/120 volt, 60 Hz power module for use in the United States. 100/200/220/240/volt, 50 Hz power module for use in Europe, Japan and other countries outside the United States.

In one embodiment of the present invention, the high-speed wireless interface 107 is an IEEE 802.11a, 802.11b, 802.11g, other 802.11xx, 802.16a, 802.16e, 802.16g, 802.16xx, or other wireless interfaces. However, the present invention is not limited to such a wireless interface, and the high-speed wireless interface 107 includes other or equivalent short-range or long-range wireless interfaces.

The exemplary wireless, integrated phone-based home gateway interface hardware architecture 100' includes a security module 109. In one embodiment of the present invention, the security module 109 includes a software cryptographic engine. In another embodiment of the present invention, the security module 109 includes further includes hardware cryptographic accelerator.

The high-speed wireless interface 107 can be used without the ADSL ATU-R 104, but in combination with the RJ-11 interface 110 and the POTS telephone module 108. In such an embodiment, the RJ-11 interface 110 and the POTS telephone module 108 are used to provide service provisioning and voice calls via the PSTN 22 that can be connected to other wireless devices via the high-speed wireless interface 107. In such an embodiment, the high-speed wireless interface 107 is also connected to the POTS telephone module 110.

In yet another embodiment of the present invention (not illustrated in FIG. 6), the high-speed wireless interface 107 is used in combination with the ADSL ATU-R 94, the RJ-45 interface 111, the RJ-11 interface 108 and the POTS telephone module 110 to provide both wireless and wired access to integrated, phone-based home gateway interface 36 (FIG. 3). For one skilled in the art, various other combinations of the wireless and wired components described herein are also possible to provide both data and voice communications in a phone-based home gateway.

In one embodiment of the present invention, the integrated communications micro-controller 114 includes a StrongARM SA-110, from the Intel Corporation of Santa Clara, Calif. The StrongARM SA-110 is a high-performance, low-power processor for portable wireless multi-media devices. However, other or equivalent micro-controllers can also be used and the present invention is not limited to this Intel micro-controller.

The integrated phone-based home gateway interface architecture 100 also includes one or more banks of memory such as synchronous dynamic random access memory ("SDRAM") 116, synchronous mask read only memory ("SMROM") 118, flash memory 120, static RAM ("SRAM") 122 and one or more RS-232 interfaces 124 for connecting serial devices. Memory 116, 118, 120, 122 and RS-232 interfaces 124 are connected to the integrated communications micro-controller 114.

As is known in the art, SDRAM 116 is a form of dynamic random access memory ("DRAM") that can run at higher clock speeds than conventional DRAM. The SDRAM 116 is connected to receive and transmit buffer 102. SMROM 118 is a form of ROM that can be accessed using bit-masks that are typically 32-bits in size. Flash memory 120 is special type of erasable programmable ROM that can be erased and reprogrammed in blocks instead of one byte at a time. SRAM 122 is form of RAM that retains information as long as there is enough power to run a device. The RS-232 interface 124 standard defines specific lines and signal characteristics used by serial communications controllers to standardize the transmission of serial data between devices.

In a typical configuration memory 116, 118, 120, 122 includes memory blocks of 64 Mbytes to 512 Mbytes in size. The memory 116, 118, 120, 122 can be configured using many different types of memory layouts and memory sizes.

The integrated communications micro-controller 114 is connected with one or more high-speed serial ports ("HSSP") 126 or a high-speed serial bus (not illustrated) to a black and white, grey scale or color liquid crystal display ("LCD") component 128 used for the display screen 40, a Bluetooth radio module 130 included in the Bluetooth component 52, an infra data association ("IrDA") module 132, an HPNA module 134 included in the HPNA component 50, one more audio/video CODEC modules 136, and one or more Personal Computer Memory Card International Association ("PCMCIA") interface modules 138.

As is known in the art, the IrDA module 132 is used for synchronizing and transmitting data via infrared light waves and is used to provide one type of short-range wireless connection. The audio/video CODECs 136 are coders/decoders used to convert audio or video signals between analog and digital forms and/or are compressors/decompressors for compressing and decompressing audio and video data.

In one embodiment of the present invention, Motion Pictures Expert Group ("MPEG-2") codecs are used. As is known in the art, MPEG is a set of standards for audio and video compression established by the Joint ISO/IEC Technical Committee on Information Technology. The original MPEG standard for storing and retrieving video and audio information, was designed for CD-ROM technology. MPEG-1 defines data cell encoding for a medium bandwidth of up to 1.5 Mbps, two audio channels, and non-interlaced video. MPEG-2 is an extension of the MPEG-1 standard designed for broadcast television, cable television (CATV) including high definition (HDTV). MPEG-2 defines a higher bandwidth of up to 40 Mbps, five audio channels, a wider range of frame sizes, and interlaced video.

MPEG-2 in general is defined in the ISO/IEC Standard JTC1/SC29/WG11, entitled "Coding of Moving Pictures and Audio," incorporated herein by reference. MPEG-2 is also defined by the ITU-T H.222.0, standard entitled "Generic coding of moving pictures and associated audio information," the contents of which is incorporated herein by reference. However, other audio/video data codecs could also be used and the present invention is not limited to the MPEG codecs described.

During an audio/video conferencing call, or a voice call, audio information is typically supplied by audio equipment (e.g., a handset, microphone/speaker, speaker-phone, etc.) that uses an audio codec to capture audio information. For example, such audio codecs are compliant ITU-T G.711, G.722, G.723, G.728 and G.729 standards, the contents of which are incorporated herein by reference. However, other audio codecs could also be used and the present invention is not limited to such audio codecs.

The one or more PCMCIA interfaces 148 are standard interfaces for small credit-card size peripherals and slots designed to hold them, primarily on laptop, palmtop, and other portable devices including intelligent electronic devices. As is known in the art, PCMCIA interfaces 138 comprises group of manufacturers and vendors who collaborated to promote a common standard for PC Card-based peripherals.

The integrated phone-based home gateway interface architecture 100 system and wireless, integrated phone-based home gateway interface architecture 100' are described with a number of specific components. However, the present invention is not limited to these specific components and more, fewer or equivalent components can also be used in the integrated phone-based home gateway interface architecture 100 and wireless, integrated phone-based home gateway interface architecture 100'

Exemplary Home Gateway Interface Software Architecture

Figure 7:
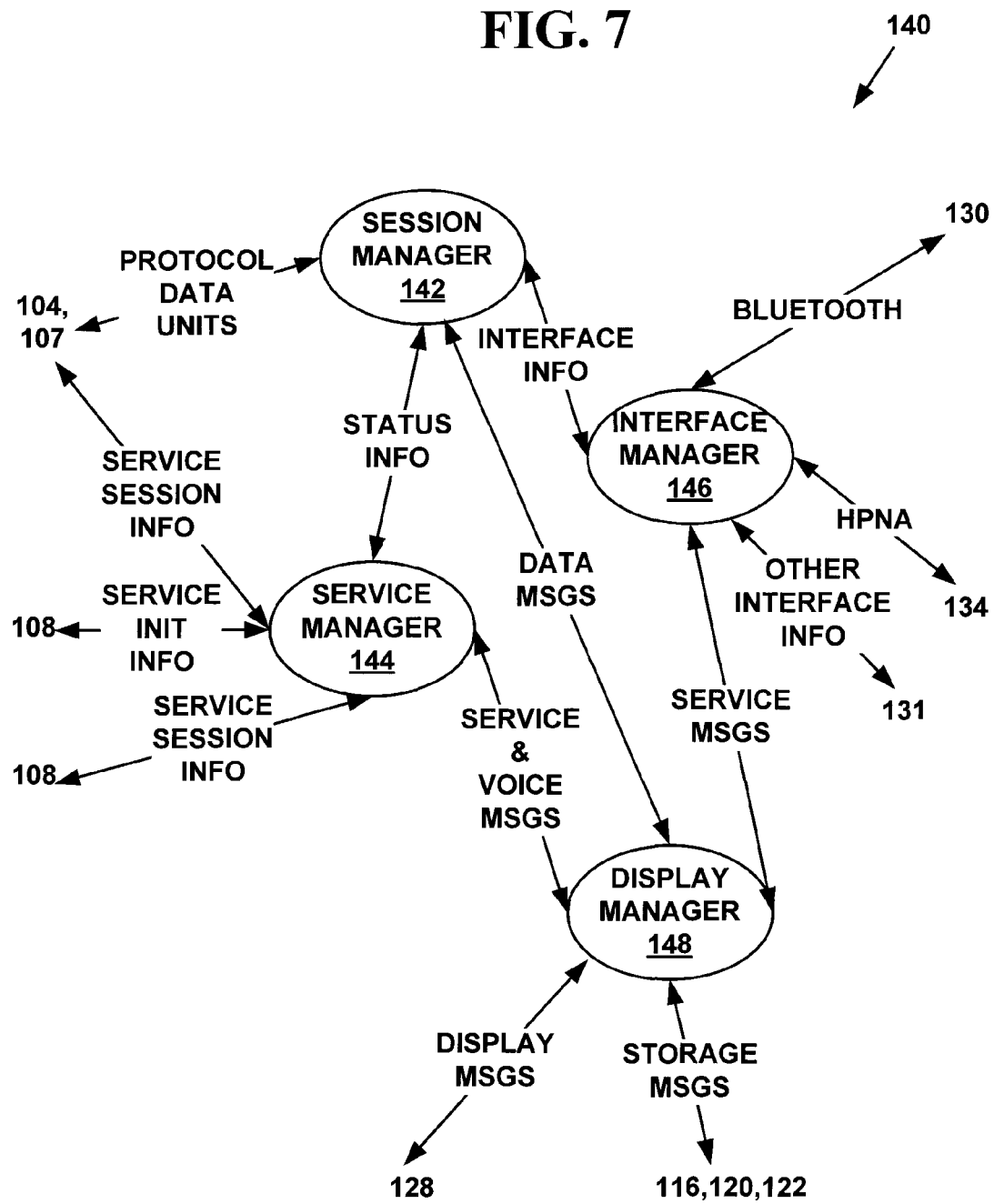
FIG. 7 is a block diagram illustrating an exemplary phone-based home gateway interface software architecture.

FIG. 7 is a block diagram illustrating an exemplary home gateway interface software architecture 140. The home gateway interface software architecture 140 includes a session manager 142, a service manager 144, an interface manager 146 and a display manger 148. However, more, fewer or equivalent software components can be used and the present invention is not limited to these software components. In FIGS. 7-11, external communications paths, i.e., communications paths external to a component in the software architecture 140 are illustrated with two-way arrows. Internal communications paths, i.e., communications paths internal to a component in the software architecture 140 are illustrated with lines without arrow heads. However, the internal communications path also provides two-way communications.

Figure 8:
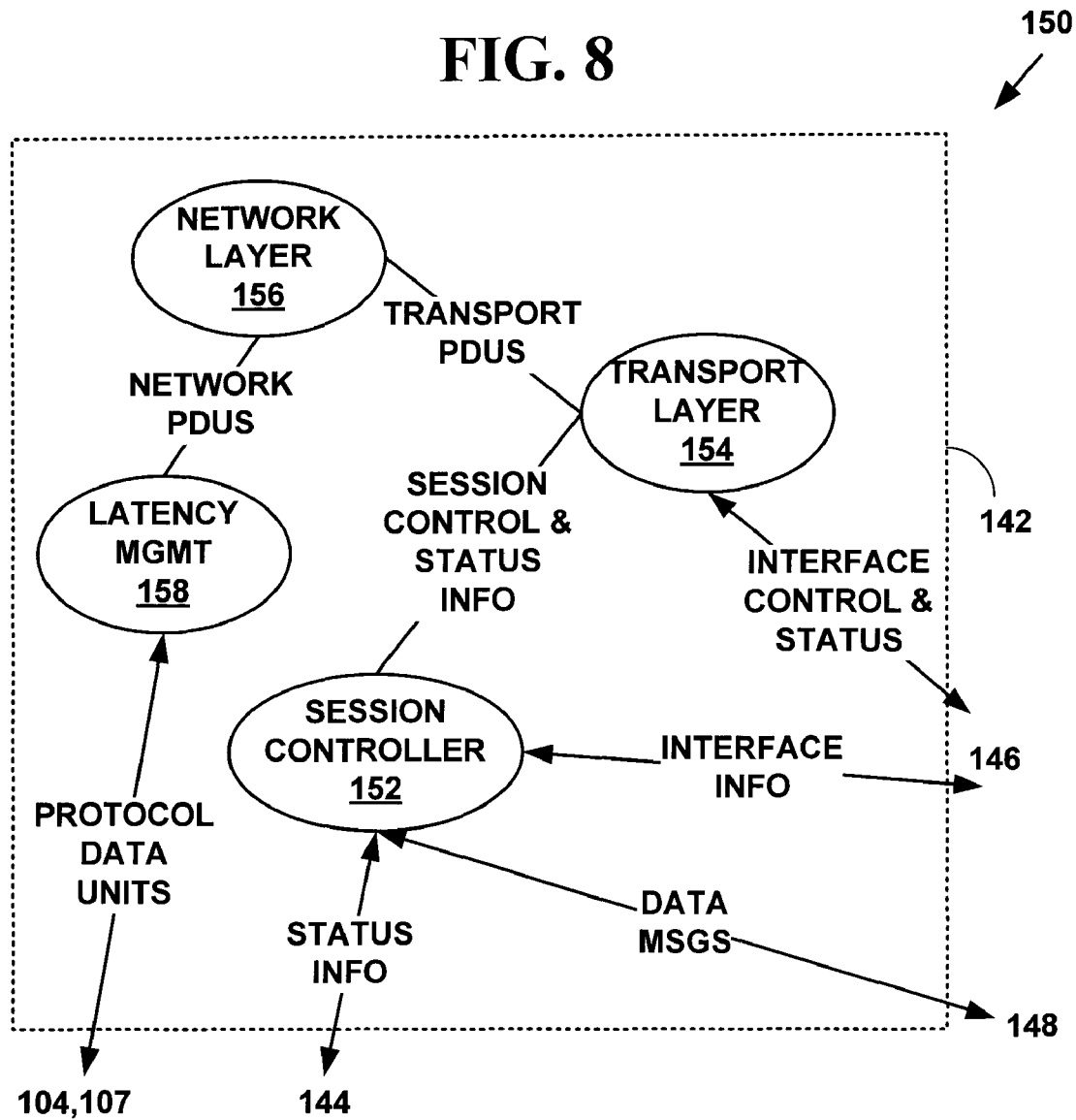
FIG. 8 is a block diagram illustrating an exemplary session manager software architecture.

FIG. 8 is a block diagram illustrating an exemplary session manager 142 software architecture 150. The session manager 142 includes a session controller module 152 that sends and receives status information to and from the service manager 144. The session controller module 152 also sends and receives interface information to and from the interface manager 146 and sends and receives data messages to and from the display manager 148. The session controller module 152 also helps initialize data interfaces, such as IP interfaces with cooperation from the provisioning manager module 164 (FIG. 9) in the service manager 144.

The session controller module 152 also sends and receives session control and status information to and from a transport layer 154 that is in communications with a network layer 156.

The transport layer 154 is the fourth of the seven layers in the OSI reference model. The transport layer 154 is typically responsible for both quality of service and accurate delivery of information. Among the tasks performed on this layer are error detection and correction.

The transport layer 154 sends and receives transport layer protocol data units ("PDU") to and from the network layer 156. As is known in the art, a PDU is a data packet layout with a header and a data payload. The transport layer 154 also sends and receives session control and status information to and from the session controller module 152 and sends and receives interface control and status information to and from the interface manager 146.

The network layer 156 is the third of the seven layers in OSI reference. The network layer 156 is one level above the data-link layer and ensures that information arrives at its intended destination. The network layer 156 sends network layer PDUs to a latency management module 158. The latency management module 158 manages latency of information on the network layer 156. The latency management module 158 sends and receives protocol data units to and from the ADSL ATU-R 104 and/or wireless RF module 107.

Figure 9:
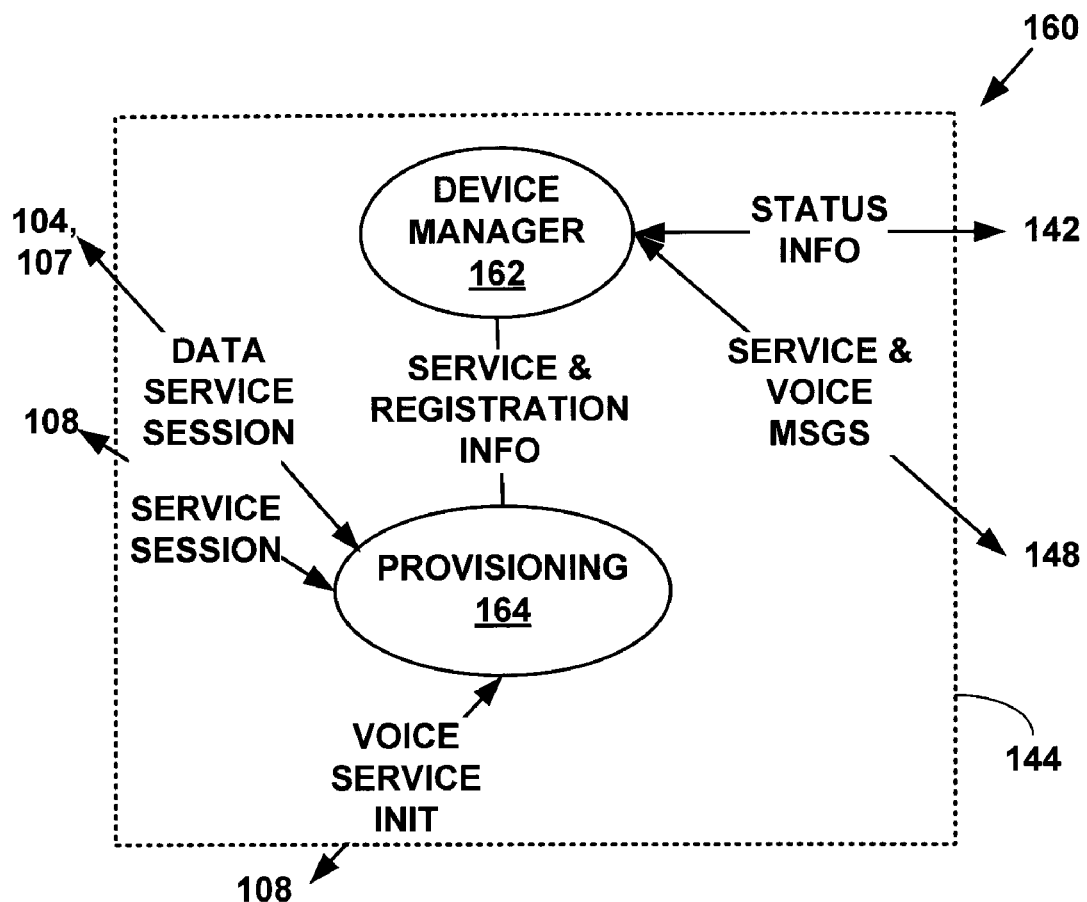
FIG. 9 is a block diagram illustrating an exemplary service manager software architecture.

In one embodiment of the present invention, the session controller module 152 provides routing and bridging functionality for networking communications and coordinates initialization of broadband communications service configurations and provisions with the provisioning manager module 164 in the service manager 144 (FIG. 9). In such an embodiment, the session controller module 152 in the session manager 142 initializes and maintains routing and bridging tables for the phone-based home gateway interfaces 36, 80. However, the present invention is not limited to such and embodiment and routing and bridging functionality can also be provided by other hardware or software components in the integrated, phone-based home gateway interfaces 36, 80.

FIG. 9 is a block diagram illustrating an exemplary service manager 144 software architecture 160. The service manager 144 includes a device manager module 162 that sends and receives status information to and from the session manager 142, and sends and receives service and voice information messages to and from the display manager 148.

The device manager module 162 also sends and receives service registration information to and from a provisioning manager module 164. The provisioning manager module 164 sends and receives service initialization information and service session information to and from the PSTN 22 via the POTS telephone module 108. The POTS telephone module 108 helps with service provisioning requests as well as handles voice calls including VoIP via the PSTN 22. The provisioning manager module 164 also sends and receives broadband service session information and data session information to and from the ADSL ATU-R 104 or wireless module 107. The ADSL ATU-R 104 or wireless module 107 also handles data communications via the PSTN 22, the Internet, wireless WAN 94, etc.

As is known in the art, an Asynchronous Transfer Mode ("ATM") system can use high-speed services on ADSL systems as a physical layer to transport data packets. ATM is a high-speed packet transmission system. ATM segments and multiplexes data traffic into small, fixed-length units called "cells." A cell is 53-octects, with 5-octects for the cell header, and 48-octects for the cell data. ATM provides four service category classes that may use constant bit-rates, variable bit-rates, available bit-rates and unspecified bit-rate services. The four ATM service classes can be used to provide Quality-of-Service ("QoS") functionality. The provisioning manager module 164 is used to set-up ATM virtual channel connections ("VCC") and other types of virtual connections or data sessions.

Figure 10:
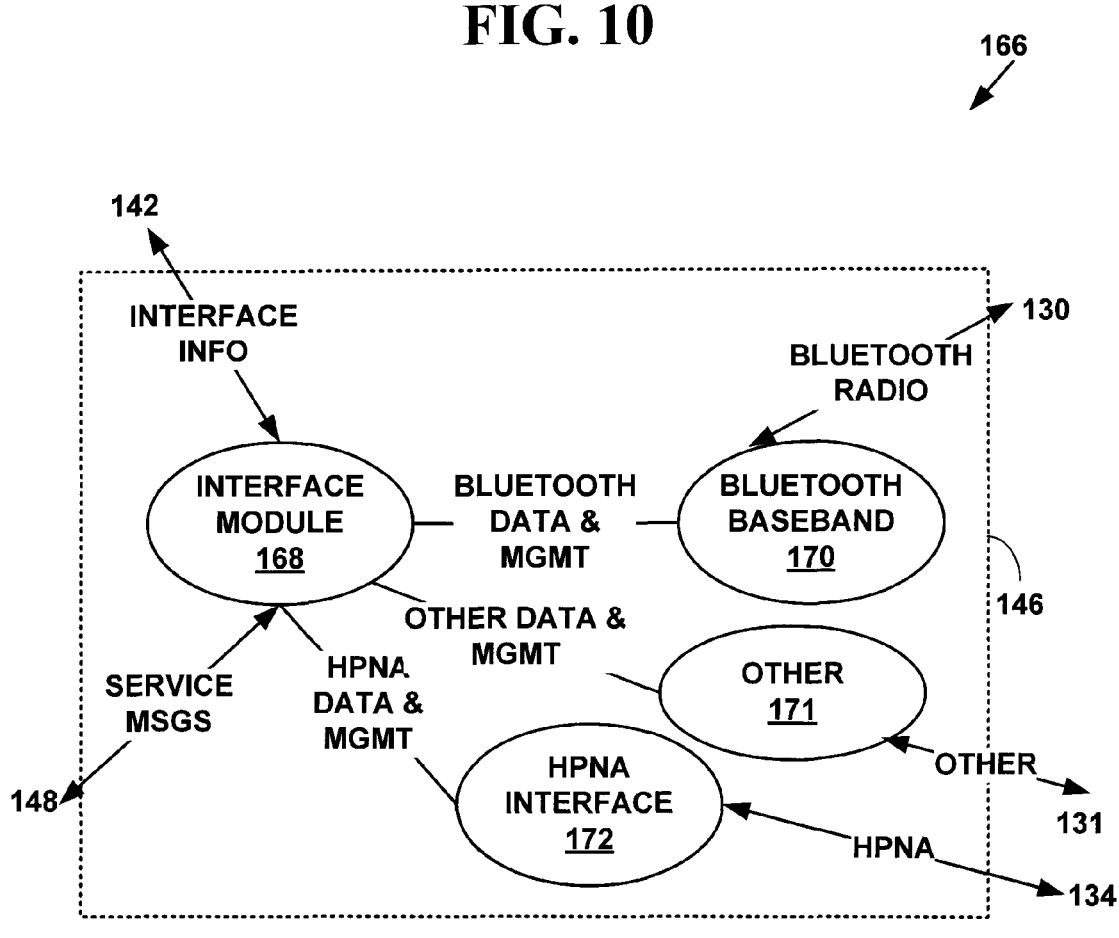
FIG. 10 is a block diagram illustrating an exemplary interface manger software architecture.

FIG. 10 is a block diagram illustrating an exemplary interface manger 146 software architecture 166. The interface manager 146 includes an interface module 168. The interface module 168 sends and receives interface information to and from the session manager 142 and sends and receives service messages to and from the display manager 148.

The interface module 168 also sends and receives Bluetooth data and management information to and from a Bluetooth baseband module 170. The Bluetooth baseband module 170 sends and receives Bluetooth radio information to and from the Bluetooth radio module 130.

The interface module 168 also sends and receives HPNA data and management information to and from an HPNA interface module 172. The HPNA interface module 172 sends and receives HPNA information to and from HPNA module 134.

The interface module 168 also sends and receives data, messages and management information to and from other interfaces 171 including wireless, wired, security and other interface modules described herein.

Figure 11:
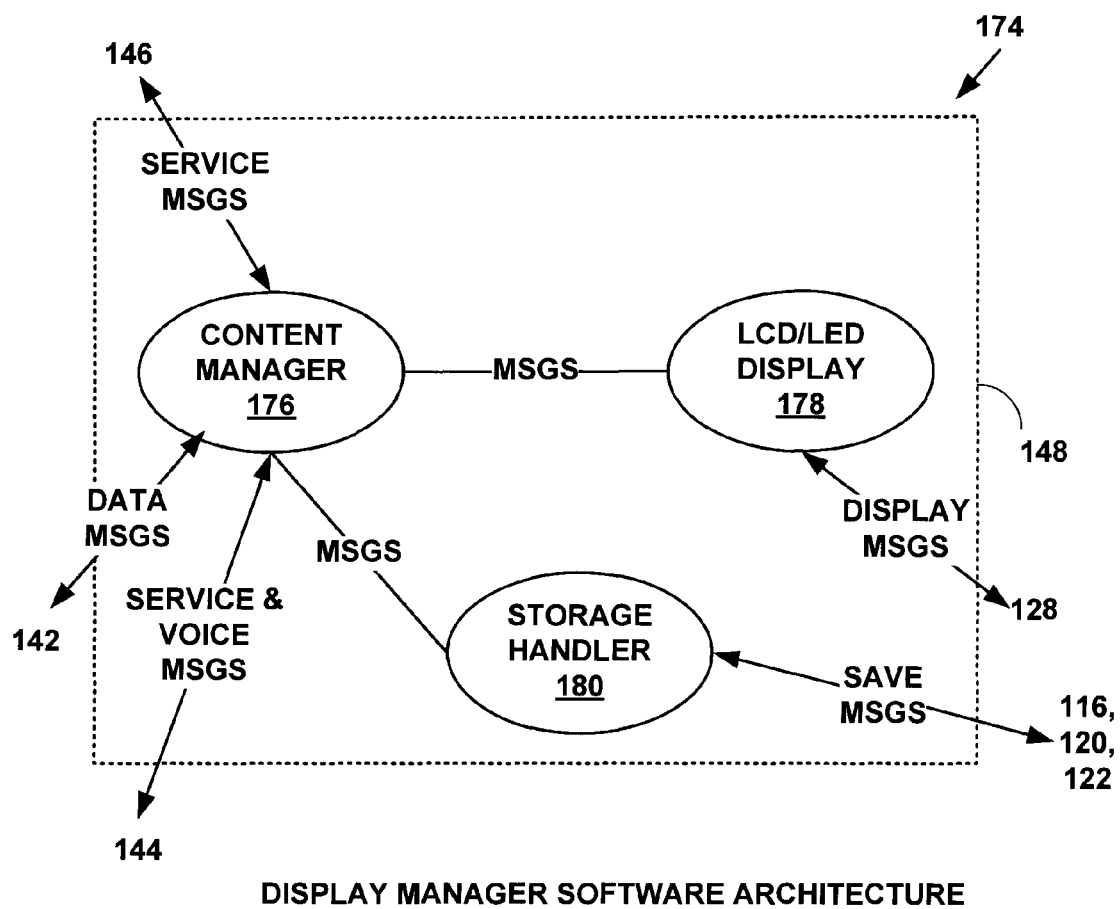
FIG. 11 is a block diagram illustrating an exemplary display manager software architecture.

FIG. 11 is a block diagram illustrating an exemplary display manger 148 software architecture 174. The display manager 148 includes a content manager module 176. The content manager module 176 sends and receives data messages to and from the session manager 142, sends and receives services and voice messages to and from the service manager 144 and sends and receives service messages to and from the interface manger 146.

The content manager module 176 also sends and receives messages to and from a LCD/Light Emitting Diode ("LED") display module 178 and a storage handler module 180. The LCD display module 178 sends and receives display messages to and from the LCD module 128. The storage handler module 180 sends and receives storage messages to and from memory 116, 120, 122.

FIGS. 1-5 illustrate exemplary stand-alone integrated phone-based home gateway systems. In many instances however, a home user will already have an existing phone system, and desire to use the functionality of the integrated or wireless, integrated phone-based home gateway systems described herein. In another embodiment of the present invention, the integrated phone-based home gateway system comprises an integrated phone-based home gateway conversion system without a display screen 40, keypad 42, optical video camera 54, etc.

Figure 12:
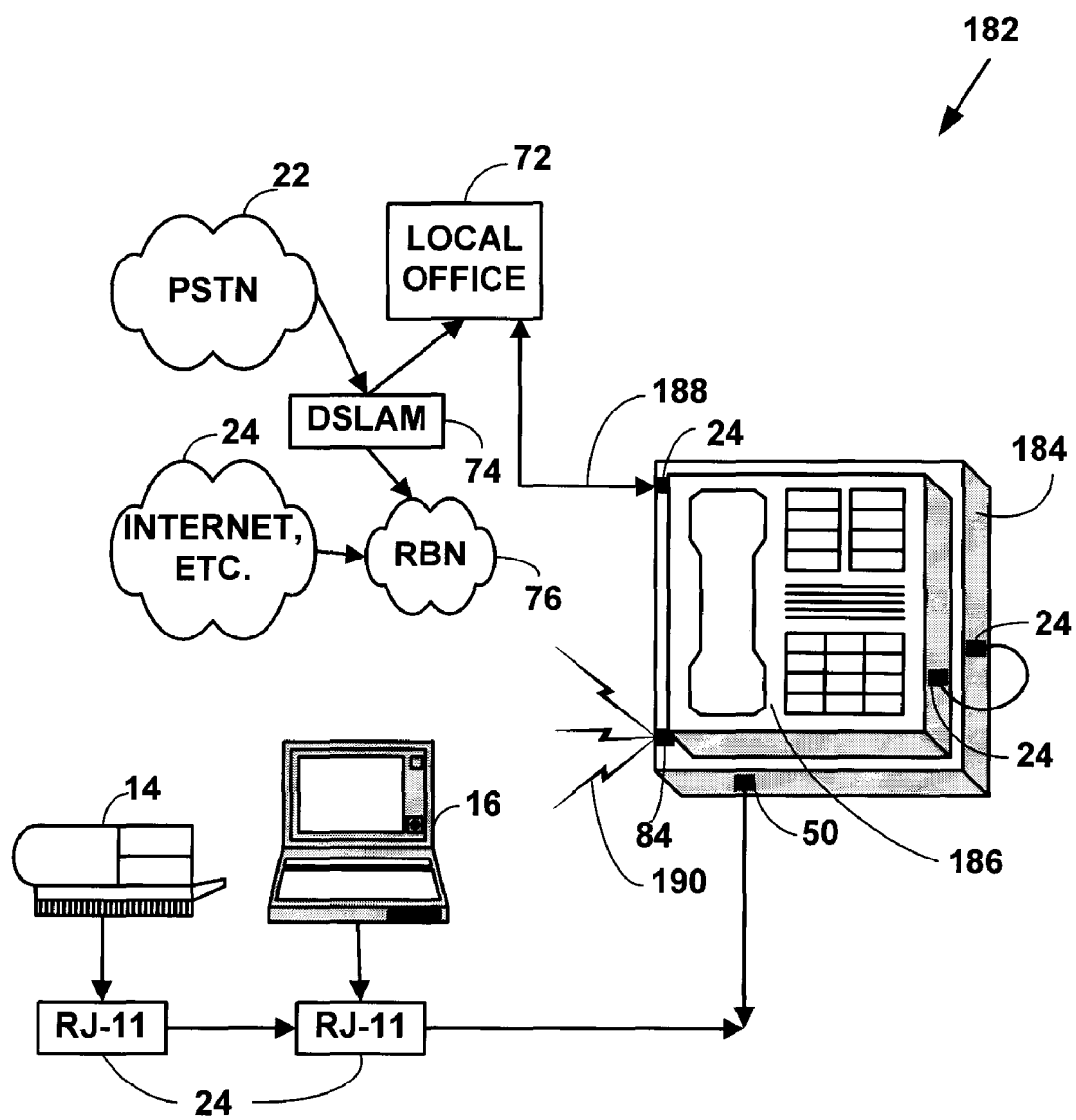
FIG. 12 is a block diagram illustrating an integrated phone-based home gateway conversion system for an existing phone system.

FIG. 12 is a block diagram illustrating an integrated phone-based home gateway conversion system 182. The integrated phone-based home gateway conversion system 182 includes an integrated phone-based home gateway conversion module 184 that is used in combination with an existing phone system 186. In one embodiment of the present invention, the integrated phone-based home gateway conversion module 184 is approximately the same size and shape of the existing phone system 182 and includes multiple RJ-11 jacks 24, a HPNA 50 connector as well as other communications components described above for phone-based home gateway systems 34, 78. The multiple RJ-11 jacks and the HPNA 50 connector allow the existing phone system 186 to be connected to the integrated phone-based home gateway conversion module 184, other devices on LAN 12 in a SOHO network, as well as to the PSTN 22 and/or Internet 24.

Since the integrated phone-based home gateway conversion module 184 is approximately the same size and shape of the existing phone system 182, the conversion module 184 can be used with an existing phone system 182 without taking up much additional space in the home or office of a home user. The size of the illustrated conversion module 184 is slightly larger than the existing phone system only for the purposes of illustration in the drawing. The integrated phone-based home gateway conversion module 184 includes wired 188 and/or wireless 190 connections as were discussed above for the integrated and wireless integrated home gateway systems 34, 78.

Exemplary Home Gateway Interface Initialization

Figure 13:
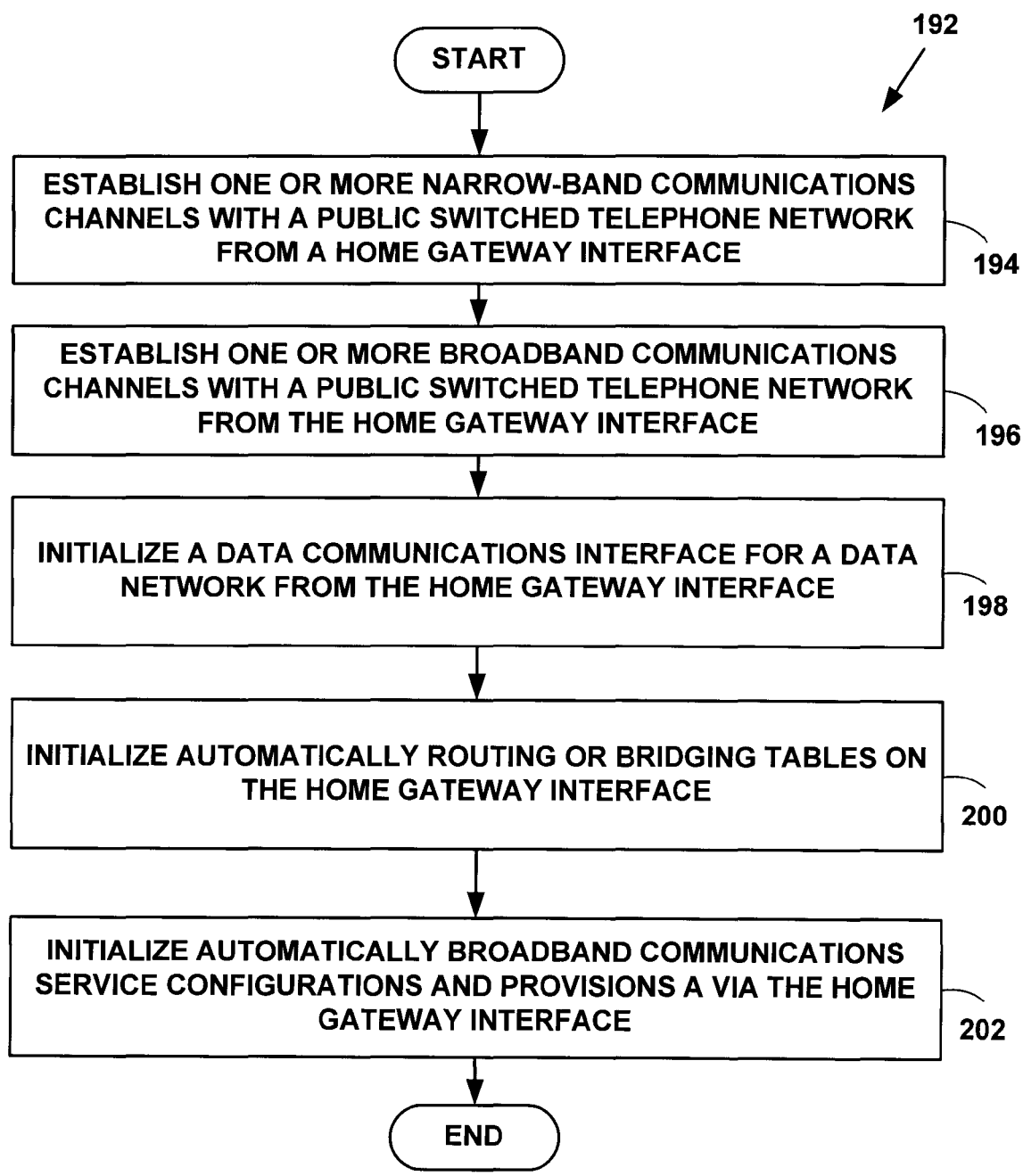
FIG. 13 is a flow diagram illustrating a method for initializing communications from a home gateway interface.

FIG. 13 is a flow diagram illustrating a Method 192 for initializing communications from the phone-based home gateway interfaces 36, 80. At Step 194, one or more narrow-band communications channels are automatically established with a public switched telephone network 22 from the phone-based home gateway interfaces 36, 80. At Step 196, one or more broadband communications channels are automatically established with a public switched telephone network 22 from the phone-based home gateway interfaces 36, 80. At Step 198, a data communications interface is automatically initialized for a data network 24 from the phone-based home gateway interfaces 36, 80. At Step 200, routing or bridging tables are automatically initialized on the phone-based home gateway interfaces 36, 80. At Step 202, broadband communications service configurations and provisions are automatically initialized via the phone-based home gateway interfaces 36, 80.

Method 192 helps hide data and broadband configuration and service provisioning complexity from home users by automatically establishing communications channels and providing automatic initialization communications and networking configuration parameters. Method 192 is illustrated with one exemplary embodiment of the present invention. However, the present invention is not limited to such an embodiment and other or equivalent embodiments can also be used.

In such an embodiment at Step 194, one or more narrow-band communications channel, such as an analog 48 communication channels for POTS 108, are established automatically with the PSTN 22 from the phone-based home gateway interfaces 36, 80.

In one embodiment of the present invention, the narrow-band communications channel is used to provide a conventional wired voice channel, communications channel redundancy, as well as provide automatic broadband service provisioning and configuration. In such an embodiment the narrow-band communications channel is also used to help initialize other components of the phone-based home gateway interfaces 36, 80. However, the present invention is not limited to such and embodiment.

At Step 196, one or more broadband communications channels such as an ADSL 104, ATM over ADSL 104 or other broadband communications channel is established automatically with the PSTN 22. In one embodiment of the present invention, the broadband communications channel is used to provide broadband voice, video or data communications with the PSTN 22 or Internet 24. However, the present invention is not limited to such an embodiment.

At Step 198, a data communications interface is automatically initialized, such as an IP interface, for the Internet 24. The automatic initialization includes initializing network addresses such as IP and other types of network addresses, and initializing data network configuration parameters. The automatic initialization helps hide initialization and configuration complexity from users of the home gateway interfaces.

At Step 200, routing or bridging tables are automatically initialized in the communications interface 44. As is known in the art, a routing table is table of information that provides network hardware (bridges and routers) with the directions needed to forward packets of data to locations on other networks. The information included in a routing table differs according to whether it is used by a bridge or a router.

A bridge relies on both a source (i.e., originating) and destination addresses to determine where and how to forward a packet. A router relies on the destination address and on information in the table that gives the possible routes—in hops or in number of jumps—between itself, intervening routers, and a destination. The routing or bridging tables also provide NAT and PAT for the phone-based home gateway interfaces 36, 80. In one embodiment of the present invention, the routing and bridging tables are initialized by the session manager 142. However, the present invention is not limited to this embodiment and the routing and bridging tables can be initialized by other components or modules in the phone-based home gateway interfaces 36, 80 and/or with or without help from the remote applications.

At Step 202, broadband communications service configurations and provisions are automatically initialized via the phone-based home gateway interfaces 36, 80. In one embodiment of the present invention, the session manager 142 coordinates this task with the provisioning manager module 164 in the service manager 148. However, the present invention is not limited to such an embodiment. The narrow-band communications channel is used to automatically initialize broadband communications services, such as ASDL, ATM, etc. services.

In a preferred embodiment of the present invention, Method 192 is practiced with the phone-based home gateway interfaces 36, 80 by sending and receiving telephony initialization and provisioning signals to and from the PSTN 22, and data protocol initialization sequences to and from the Internet 24, to provision, establish and initialize narrow-band and broadband communications channels and automatically populate routing and bridging tables.

In another embodiment of the present invention, the narrow-band communication channel is used to call a toll free number (e.g., 800, 888, etc.) to establish communications with specialized remote software applications that assist in automatically populating routing and bridging tables and provisioning, establishing and initializing communications channels to/from the phone-based home gateway interfaces

36, 80. In such an embodiment, the remote applications may be included at the local switching office 72 or at some other location on the PSTN 22 or the Internet 24 (e.g., at 3ETI's home site on the Internet).

In such an embodiment, the remote applications specifically help configure and initialize the phone-based home gateway interfaces 36, 80 with two-way dynamic communications any time a home user desires to configure and initialize an interface 36, 80. The dynamic two-way communications over the narrow-band communications channel are used to assist in automatically populating routing and bridging tables, provisioning, establishing and initializing other communications channels to/from the phone-based home gateway interfaces 36, 80.

In another embodiment of the present invention, a remote application may send a static configuration file that is then used by the phone-based home gateway interfaces for automatically populating routing and bridging tables and provisioning, initializing and establishing other communications channels to/from the phone-based home gateway interfaces 36, 80. The configuration file can be dynamically updated by periodically contacting the remote application for updates.

However, the present invention is not limited to such embodiments and other or equivalent embodiments can also be used. In addition, no remote software applications are necessary to practice preferred embodiments of present invention.

The phone-based home gateway interfaces described herein can used as broadband home gateway, a wireless local loop home gateway, as well as a set-top box for a cable television access. The phone-based home gateway interfaces are modular, flexible, plug-n-play home gateways. The home gateway interfaces hide routing and bridging table population, data (e.g., IP) and broadband service configuration and provisioning complexity from home users by providing automatic population of routing and bridging tables, establishment of communications channels, initialization and provisioning of communication channel parameters.

Security and Encryption

Wireless Encryption Protocol ("WEP") (also called "Wired Equivalent Privacy") is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11 standard includes two main developments: Wi-Fi Protected Access ("WPA") and Robust Security Network ("RSN").

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol ("EAP"). One proposed encryption algorithm is an Advanced Encryption Standard ("AES") encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard ("AES") to keep government information secure. AES is intended to be a stronger, more efficient successor to Triple Data Encryption Standard ("3DES"). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt ("EDE") mode of the DES cipher algorithm. 3DES is defined in the ANSI standard, ANSI X9.52-1998, the contents of which are incorporated herein by reference. DES modes of operation are used in conjunction with the NIST Federal Information Processing Standard ("FIPS") for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified ("SBU") communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, firewalls are a security feature used to protect a network from potentially hostile attacks from outside the network. For example, a firewall may protect LAN 12 from malicious attacks from the Internet 24 or another network 22. Firewalls typically provide security services by filtering out data traffic that may be inappropriate, suspicious or dangerous. To implement filtering, a firewall is designed to interpret the type of data traffic that is being sent through it. The more information that a firewall has about transactions taking place through it, the more security it can provide.

Firewall security mechanisms include packet filtering. Packet filtering includes using the content of data packets passing through the firewall to determine if a packet should be allowed to pass through the firewall. For example, data-link layer addresses such as MAC and LLC addresses, network addresses such as IP addresses and source and destination transmission port numbers, such as TCP or User Datagram Protocol ("UDP") port numbers are used to filter data traffic.

As is known in the art, IP is an addressing protocol designed to route traffic within a network or between networks. For more information on IP 54 see IETF RFC-791 incorporated herein by reference.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768 incorporated herein by reference.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digistal signatures. The security method are negotiated between the source and destinagation at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Security Module

In one embodiment of the present invention, the security module 109 includes a software cryptographic engine with one or more cryptographic software modules. The one or more cryptographic software modules include one more types of cryptographic methods implemented in software to provide secure wired and wireless communications.

In one embodiment of the present invention, the software cryptographic engine includes software modules that support and conform to the NIST FIPS 197-2 specification for AES encryption and the NIST FIPS 46-3 specification for 3DES encryption.

In another embodiment of the present invention, the software cryptographic engine includes software modules that support and conform to the NIST FIPS 140-2 specifications for SBU use for secure wireless networking.

In another embodiment of the present invention, the software cryptographic engine includes software modules that support at least 64-bit and 128-bit WEP encryption.

In another embodiment of the present invention, the software cryptographic engine includes software modules that support at least 64-bit and 128-bit WEP, 128-bit, 192-bit and 256-bit AES and 168-bit 3DES encryption.

In another embodiment of the present invention, the software cryptographic engine includes software modules that support software modules that support and conform to the NIST FIPS 197-2 specification for AES encryption, the NIST FIPS 46-3 specification for 3DES encryption, NIST FIPS 140-2 specifications for SBU use for secure wireless networking, and the IEEE 802.11i specifications for WEP, WPA and RSN for secure wireless networking.

However, the present invention is not limited to these embodiments and the security module 109 can include a software cryptographic engine with more, fewer or other combinations thereof of cryptographic software.

In one embodiment of the present invention, the security module 109 includes a firewall that provides at least IP address filtering, TCP/UDP port filtering, and MAC/LLC address filtering.

The security module 109 may further include a hardware cryptographic accelerator. In one embodiment of the present invention, the hardware cryptographic accelerator includes a PCI-based hardware cryptographic module. The hardware cryptographic accelerator includes low latency, high-throughput hardware to provide hardware based cryptography.

In one embodiment of the present invention, the hardware cryptographic module includes a 128-bit AES module with an electronic book code ("ECB") mode and a 168-bit 3DES module with ECB and cipher block chaining ("CBC") mode. However, the present invention is not limited to such an embodiment and other embodiments can also be used for the hardware cryptographic module.

In one embodiment of the present invention, the hardware cryptographic module is targeted for AES throughput to a Xilinix XC2V2000-5FG676 from Xilinix, Inc. of San Jose, Calif. with about 166,993 Xilinx gates (i.e., including about 33,000 application specific integrated circuit ("ASIC") gates) including a pipelined design that offloads cryptographic calculations from the processor 114. This hardware cryptographic module processes about 32-bytes in about 80 PCI clock cycles or about 107 Million-bit ("Mbits") per second ("Mpbs").

This hardware cryptographic module has provided AES encryption throughput on a wireless connection of about 4.53 Mbps compared to a throughput of about 4.6 Mbps on the same wireless connection without AES encryption.

In another embodiment of the present invention, the hardware cryptographic module is targeted for 3DES throughput to a Xilinix XC2V1000-4FG456 with about 95,000 Xilinx gates (i.e., including about 19,000 ASIC gates) including a pipelined design that offloads cryptographic calculations from the processor 114. The hardware cryptographic module processes about 24-bytes in about 60 PCI clock cycles or about 106.7 Mbits per second.

This hardware cryptographic module has provided 3DES encryption throughput on a wireless connection of about 4.4 Mbps compared to a throughput of about 4.6 Mbps on the same wireless connection without 3DES encryption.

In one embodiment of the invention, the security module 109 includes MAC address filtering. As is known in the art, MAC addresses are hardware addresses that are burned into a device during its manufacture and are unique for each device. Without MAC address filtering, any wired wireless client can request access to a wired or wireless network. When MAC address filtering is enabled, however, the phone-based home gateway interface 18 performs MAC address checks. To set up MAC address filtering, an administrator configures a list of MAC addresses that will be allowed access through the security module 109.

In one embodiment of the invention, the security module 109 includes Layer 2 Tunneling Protocol (L2TP). As is known in the art, L2TP is a secure tunneling protocol used for connecting VPNs over public links such as those connected to the Internet. The IETF Internet Draft, Layer Two Tunneling Protocol, <draft-ietf-pppext-l2tp-mpls-02.txt> is incorporated herein by reference.

In one embodiment of the invention, the security module 109 includes Internet Protocol Security (IPsec). As is known in the art, IPsec is security protocol that provides authentication and encryption over the Internet. Unlike SSL, which provides services at OSI layer 4 and secures two applications, IPSec works at layer 3 (i.e., the OSI network layer) and secures networks including VPNs. The phone-based home gateway interface 18 also provides IPsec for secure communications (e.g., for VPNs). For more information on IPsec see IETF RFC-2401, the contents of which are incorporated by reference.

In one embodiment of the invention, the security module 109 also includes a security server creates and manages dynamic per session security keys (e.g., encryption keys) each time users desire a login. The security server also authenticates users by distributing and managing their individual security certificates (e.g., digital certificates).

However, the present invention is not limited to these specific hardware cryptographic modules and other hardware cryptographic modules with other designs, components and throughputs can also be used to practice the invention.

Integrated Phone Based Home Gateway Systems

In one embodiment of the invention, the wireless integrated phone-based home gateway 100' (FIG. 6B) uses WEP encryption (e.g., 64/128 bit WEP keys) to provide confidentiality for 802.11b wireless data sent from, and received on, via wireless module 107. In another embodiment of the present invention, the wireless integrated phone-based home gateway 100' uses WEP encryption to provide confidentiality for 802.11b wireless data sent from, and received on wireless module 107, via security module 109 including one or more security interfaces.

In another embodiment of the present invention, the wireless integrated phone-based home gateway 100' uses WEP, AES or 3DES via security module 109 including one or more security interfaces to provide confidentiality for wireless data sent from, and received on wireless module 107.

Integrated Wireless Access Point Systems

Figure 14:
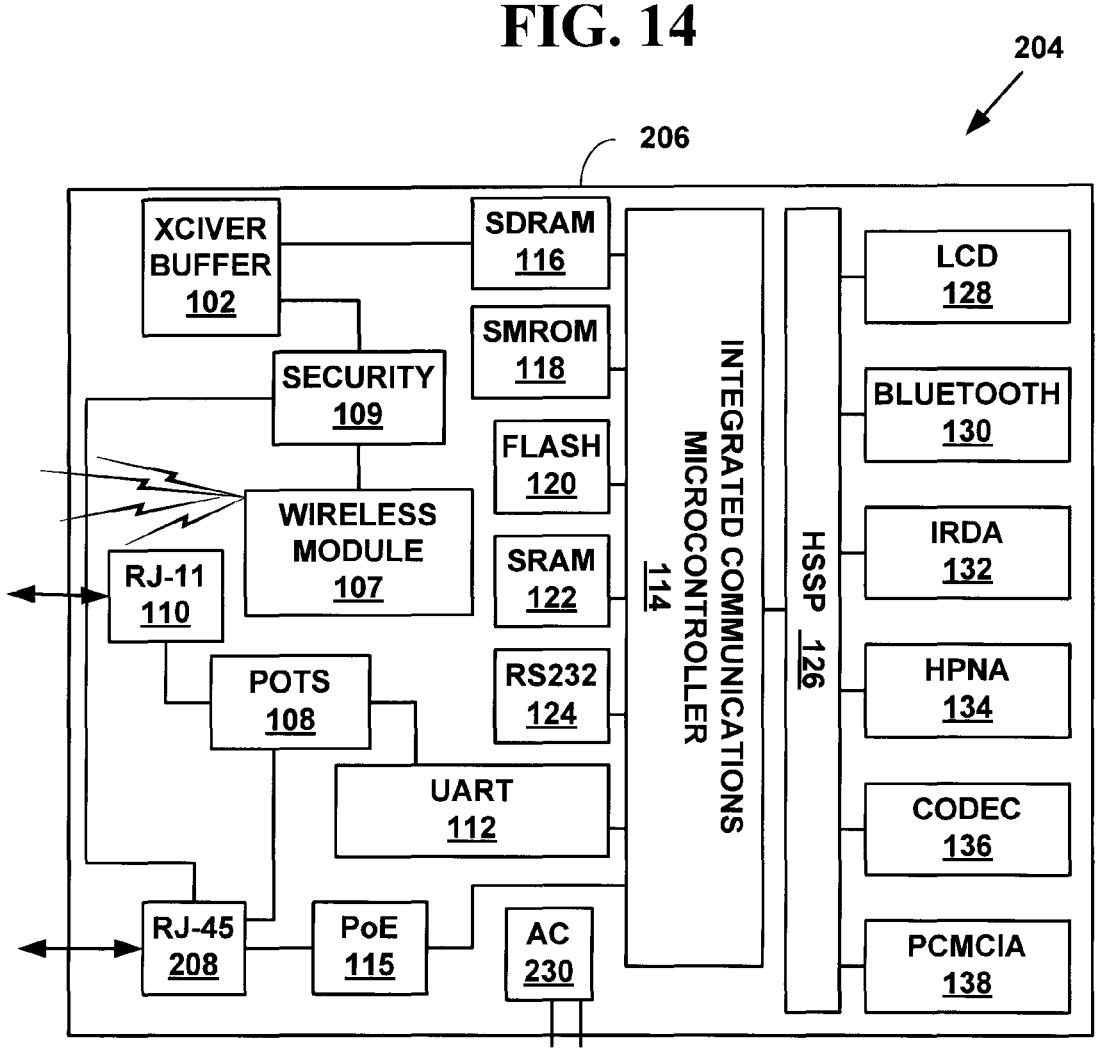
FIG. 14 is a block diagram illustrating an exemplary wireless integrated gateway interface architecture.

FIG. 14 is a block diagram illustrating an exemplary secure wireless access point architecture 204 for a wireless integrated gateway 206. The secure wireless access point 206 includes all of the networking functionality for the integrated phone-based home gateway 36, 80, but also includes additional features including security module 109, PoE module 115, and one or more RJ-45 jacks 208 and functionality to allow the wireless access point 206 to be used outside the home environment and provide secure communications to corporate, military, educational and other environments.

In one embodiment, the secure wireless access point 206 does not include the optional portable telephony handset 20, 38, 82 or the speaker-phone with a built in microphone and speaker for sending and receiving voice information or associated hardware and/or software modules.

In another embodiment, the secure wireless access point 206 does not include the optional portable telephony handset 20, 38, 82, the speaker-phone with a built in microphone and speaker for sending and receiving voice information, display screen 40, keypad 42 or optional video camera component 54 or associated hardware and/or software modules.

Figure 15:
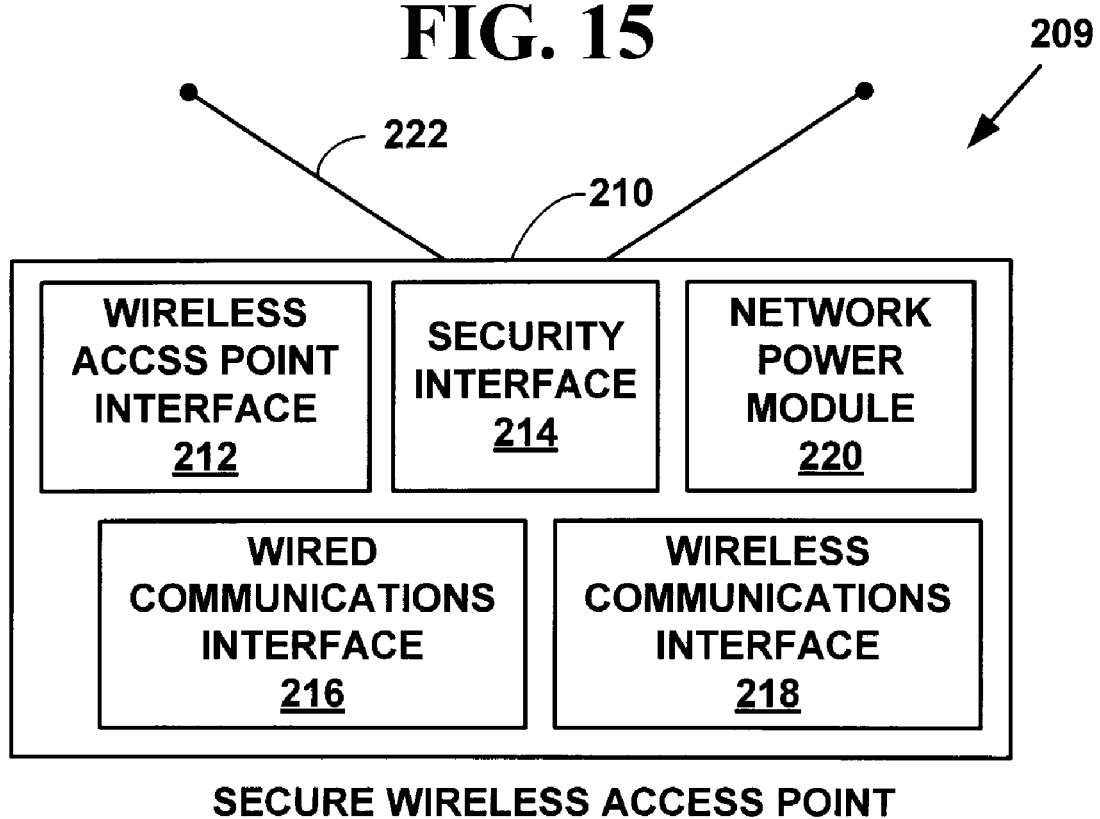
FIG. 15 is a block diagram illustrating an exemplary integrated secure wireless gateway system.

FIG. 15 is a block diagram 209 illustrating a secure wireless access point 210. The wireless access point includes a wireless access point interface 212 for initializing wireless and wired broadband communications and for automatic service provisioning for allocating, configuring and maintaining multiple transmission channels and virtual communications paths used for wired and wireless broadband communications; a wired communications interface 214 for connecting to external wired devices, for connecting to one or more wired broadband communications networks and for providing wired broadband communications; a wireless communications interface 216 for connecting to external wireless devices, for connecting to one or more wireless broadband communications networks, for providing wireless broadband communications; a security interface 218 for providing secure communications via the wired communications interface and the wireless communications interface; a network power module 220 for providing power to the integrated gateway system, wherein the network power module obtains power from a wired connected between the integrated gateway system and a communications network and two or more removable RF antennas 222.

The secure wireless access point 210 includes common hardware and software components and functionality of the phone-based home gateway interface 18 that were described in detail above.

Figure 16:
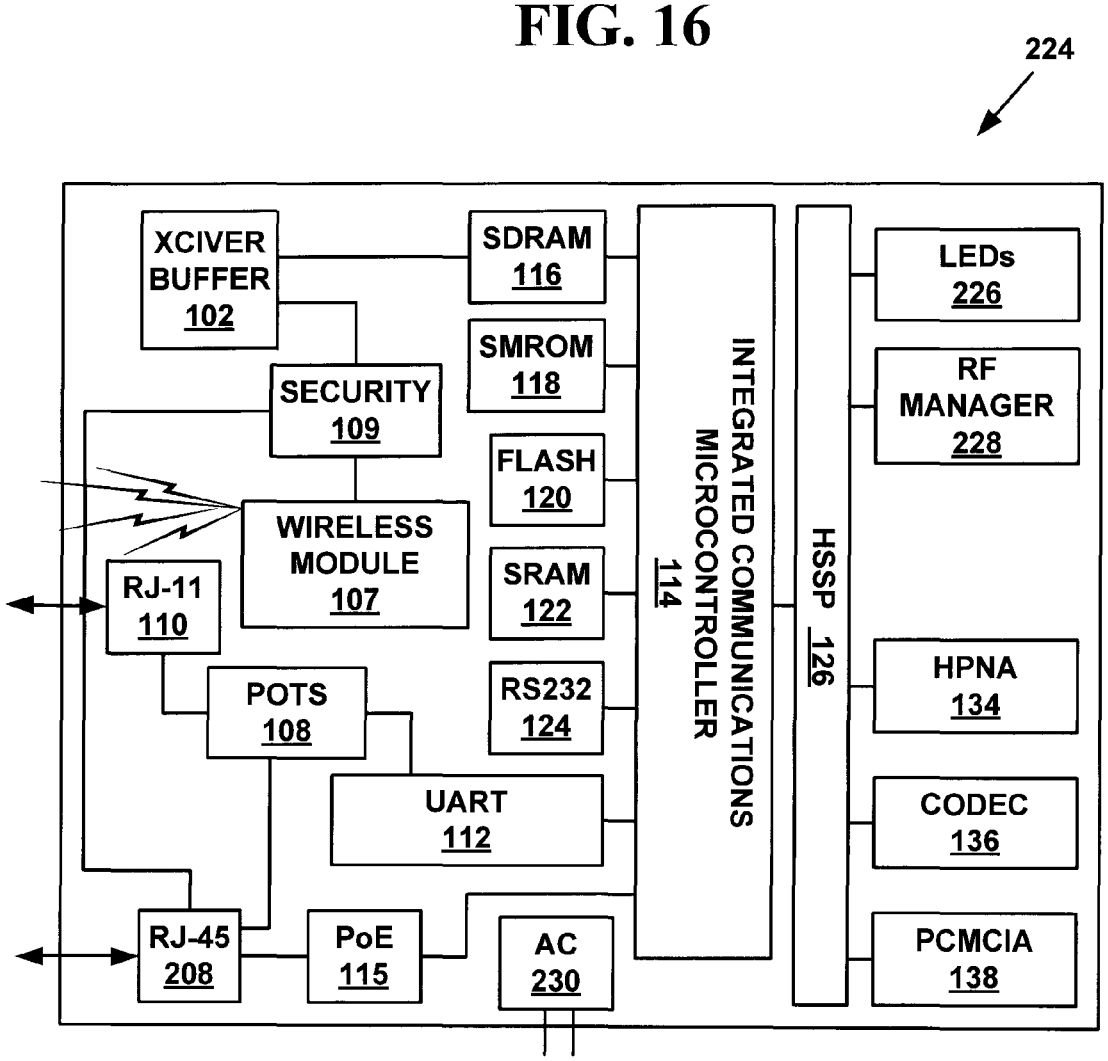
FIG. 16 is a block diagram illustrating an exemplary secure wireless gateway architecture for the integrated secure gateway system of FIG. 15.

In another embodiment, the secure wireless access point 210 further includes a wireless access pointer interface for providing gateway, routing and bridging for wireless and wired broadband networking communications and FIG. 16 is a block diagram illustrating an exemplary secure wireless access point 224 for the integrated secure gateway system of FIG. 15. The secure wireless access point 224 also includes common hardware and software components and functionality of the integrated phone-based home gateway interface architecture 100, 100' that were described in detail above. The secure wireless access point architecture 224 also includes, but is not limited to, security module 109, PoE module 115, and one or more RJ-45 jacks 208, and plural LEDs 226 an RF manager module 228, an AC power module 230 and two or more removable RF antennas 222 (not illustrated).

The LEDs 226 are used to provide status information about the secure gateway system. In one embodiment of the invention, the LEDs 226 include an LED for power, Ethernet uplink, wireless LAN activity and error states. However, the present invention is not limited to this embodiment and more, fewer or other LEDs can also be used and different LED indications can also be used.

The RF manager 228 provides radio frequency power levels to be managed remotely. The AC power module 230 provides the capability to switch to AC power and is provided as a backup module in the event the PoE module 115 is lost or unavailable.

In another embodiment of the invention, the secure wireless access point 224 further includes plural circular bayonet lock connectors (not illustrated) that meet at least the MIL-C-26482, Series 1 specifications.

FIG. 17 is a block diagram 232 illustrating the secure wireless access point system 210 in communications with a wireless piconet 86. In one embodiment, the secure wireless access point system 210 is connected to the PSTN 22. In another embodiment of the invention, the secure wireless access point system 210 is not connection to the PSTN 22.

Figure 18:
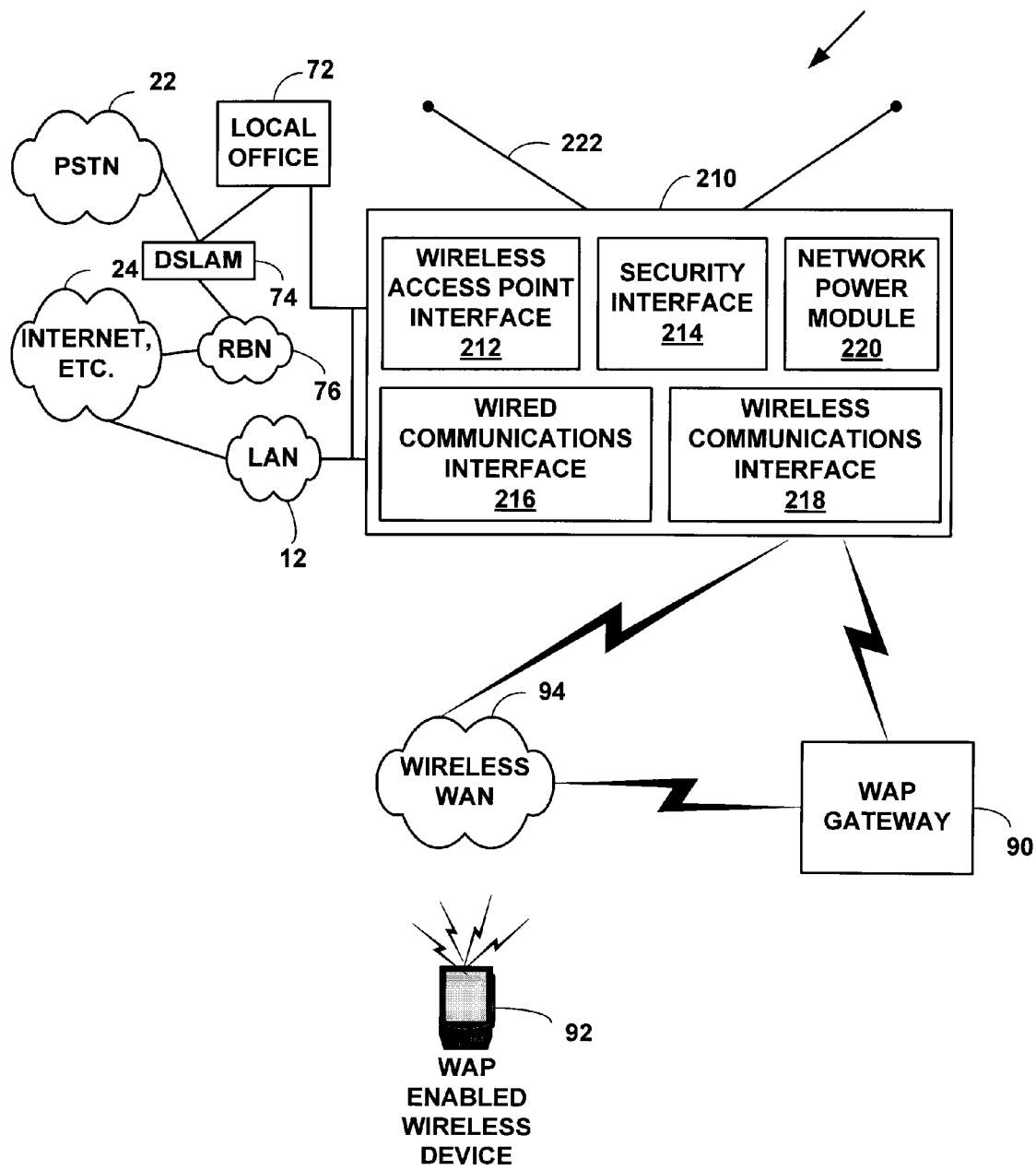
FIG. 18 is a block diagram illustrating an integrated secure wireless gateway system in communications with a wireless wide area network.

FIG. 18 is a block diagram 234 illustrating the secure wireless access point 210 in communications with a wireless WAN 94. In one embodiment, the secure wireless access point 210 is connected to the PSTN 22. In another embodiment of the invention, the secure wireless access point 210 is not connection to the PSTN 22.

In one embodiment of the invention, the wireless access point interface 212 provides gateway, routing or bridging for networking communications and automatically initializes broadband communications service configurations and provisions broadband communications services and channels. In such an embodiment, the integrated secure gateway system 210 functions as an integrated broadband wireless gateway.

In another embodiment of the invention, the wireless access point interface 212 does provide gateway, routing or bridging for networking communications but does not provide initialization of broadband communications service configurations or provision broadband communications services and channels. In such an embodiment, the secure wireless access point 210 functions as a wireless gateway and a wireless access point.

In another embodiment of the invention, the wireless access point interface 212 does not provide gateway, routing or bridging for networking communications but does provide initialization of broadband communications service configurations or provision broadband communications services and channels. In such an embodiment, the integrated secure gateway system 210 functions only as a wireless access point.

In one embodiment of the invention, the secure wireless access point 210 is initialized by Method 192 of FIG. 13 and includes the home gateway interface software architecture 140 illustrated in FIGS. 7-11 as described above.

In another embodiment of the invention, the secure wireless access point 210 includes software architecture different from home gateway interface software architecture 140.

Embodiments of the present invention can be used in a banking, commercial, government, military, education, healthcare, financial services, manufacturing or other environments that require protection of data.

Home Entertainment

In one embodiment, the integrated phone-based home gateway interface 80, 100' and secure wireless access point 210 provide automatic configuration and provisioning for broadband and narrowband wired and wireless communications for a variety of home entertainment devices.

The home entertainment devices include portable hand held game playing devices such as the Play Station Portable (PSP) by Sony, the Gameboy and DS by Nintendo, and others, digital/data assistants (PDAs), (e.g., Palm Pilot by Palm, etc.) hand held audio/video devices, including multi-function mobile phones (e.g., Ipod by Apple, Zune by Microsoft, other MP3/video players, etc.) the Iphone by Apple, etc., other similar mobile phones by Verizon and others and non-portable game playing devices such the Xbox by Microsoft, Playstation by Sony, Game Cube by Nintendo, the Wii by Nintendo and other non-portable game playing devices.

The home entertainment devices include set-top boxes (STB) or set-top units (STU) that connects to a television and an external source of signal, turning the signal into content which is then displayed on the television screen The home entertainment devices include digital video recorders (DVR) or personal video recorders (PVR) that record video in a digital format to a disk drive or other non-volatile storage. DVR's include stand-alone set-top boxes, portable media players and other devices that capture video and playback to and from the non-volatile storage. A Digital Versatile Disc or Digital Video Disc (DVD) is a popular optical disc storage media format.

The home entertainment devices include video-on-demand (VoD) devices. VoD devices allow movies and other types of entertainment to be downloaded and/or played via a communications networks 12, 22, 24, etc.

The home entertainment devices include Blu-ray Discs (also known as Blu-ray or BD). Blu-ray is an optical disc storage media format. Its main uses are high-definition video and data storage. The disc has the same dimensions as a standard DVD. The name Blu-ray Disc is derived from the blue laser (violet coloured) used to read and write this type of disc The home entertainment devices include home cinema systems or home theater systems. These entertainment systems are systems that seek to reproduce cinema quality video and audio in a private home. Home cinema systems typically include a DVD, DVR, a flat screen television and a stereo sound system.

In one embodiment, the integrated phone-based home gateway interface 100' includes all of the home entertainment devices described. In another embodiment, the integrated phone-based home gateway interface 100' includes only selected ones of the home entertainment devices described.

The integrated phone-based home gateway interface 80, 100' and secure wireless access point 210 is used to provide automatic provisioning and configuration for broadband and narrow band communications for home entertainment devices. The devices 80, 100' and 210 are also used to provide game players access to communications networks 22, 24, and local piconets and local wireless networks 70, 86, 94 for local and remote access to the home entertainment devices and provide remote single or multi-player gaming.

Home Security

In one embodiment, the integrated phone-based home gateway interface 80, 100' and secure wireless access point 210 provide automatic configuration and provisioning for broadband and narrowband wired and wireless communications for home security devices such as alarm systems 66 and home video monitoring equipment 68.

In one embodiment, the alarm systems 66 include intrusion detection systems or alarms. Intrusion detection monitors for unauthorized access to a home environment. The alarm systems 66 further include motion detectors, smoke detectors, carbon monoxide (CO) and carbon dioxide ($CO_2$) detectors, fire detectors, fall-in-pool detectors and home medical emergency detectors.

The video monitoring systems 68 include wireless and wired video cameras. The video monitoring systems 68 also include audio monitoring.

Figure 19:
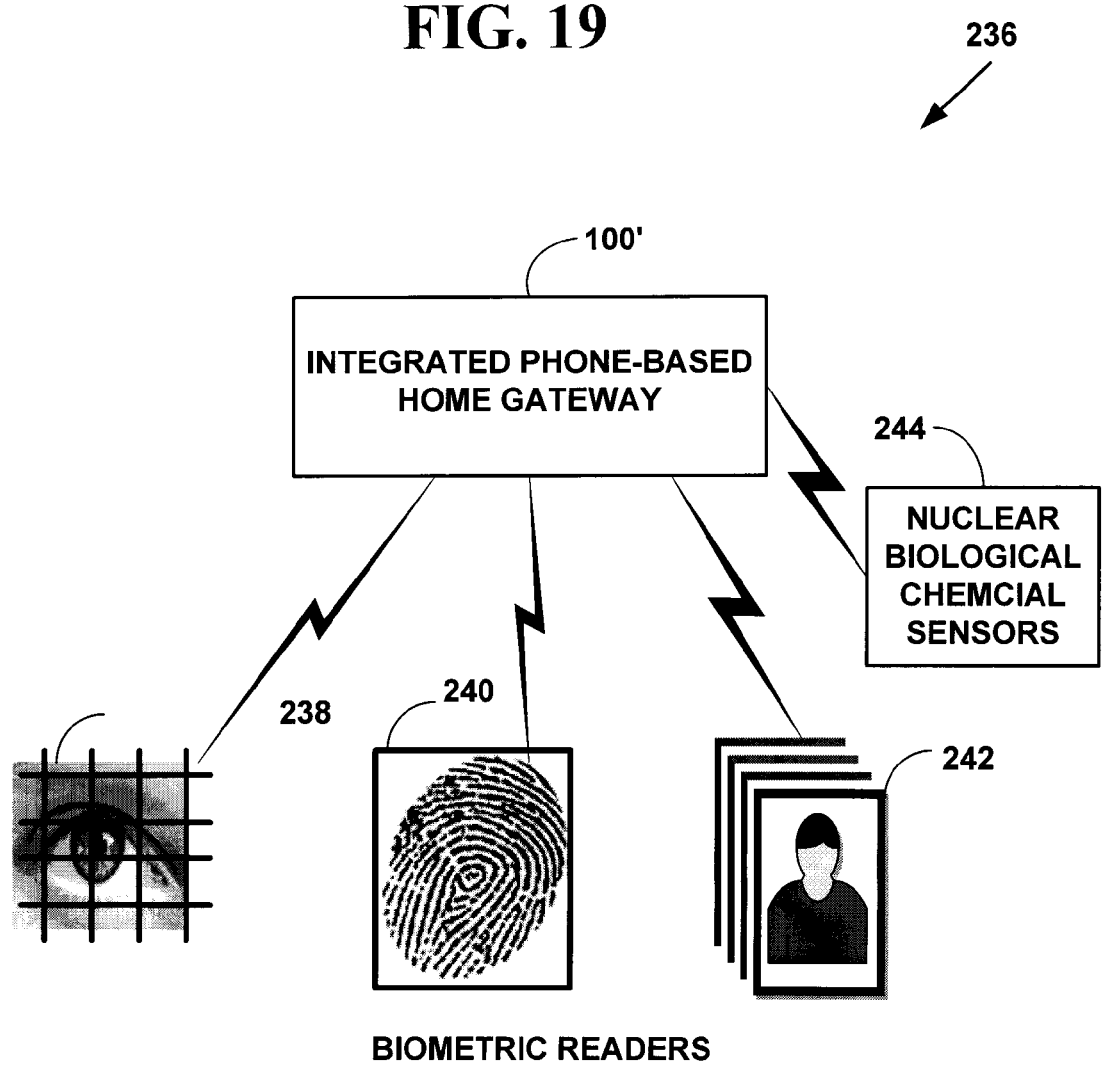
FIG. 19 is a block diagram illustrating an integrated phone-based home gateway interface with home security devices.

FIG. 19 is a block diagram 236 illustrating an integrated phone-based home gateway 80, 100' with home security devices.

In one embodiment, the integrated phone-based home gateway interface 80, 100' provides home access control for controlling access to a home environment and any of plural devices stored therein (e.g., 56-64, etc.) In such an embodiment, the integrated phone-based home gateway interface 80, 100' includes biometric readers. The biometric readers include iris scan readers 238, fingerprint readers 240, facial recognition readers 242 and other biometric readers.

In one embodiment, the integrated phone-based home gateway interface 100' provides Nuclear Biological and Chemical (NBC) monitoring to detect terrorist attacks. In such an embodiment, specialized sensors 244 for detecting nuclear, biological (e.g., anthrax, etc.) and chemical (e.g., nerve agents, etc.) substances are connected to the integrated phone-based home gateway interface 80, 100' via wired or wireless connections. For example, sensor devices provided by Universal Detection Technologies, Inc. of Beverly Hills, Calif. and other companies who provide similar NBC sensor devices.

In one embodiment, the security module 109 provides an interface for the biometric readers 238-242 and the NBC monitors 244. However, the present invention is not limited to such an embodiment and other existing or additional modules can also be used to practice the invention.

In another embodiment, both the secure wireless access point 210 also provides access control, intrusion detection and NBC monitoring for a home environment and other than a home environment. In other than a home environment, the secure wireless access point 210 provides access control, intrusion detection and NBC monitoring for local and/or remote locations.

The integrated phone-based home gateway interface 80, 100' and secure wireless access point 210 is used to provide automatic provisioning and configuration for broadband and narrow band communications for home security devices. The devices 80, 100' and 210 are also used to access to communications networks 22, 24, and local piconets and local wireless networks 70, 86, 94 for local and remote access to the home security devices.

In one embodiment, the integrated phone-based home gateway interface 100' includes all of the access and monitoring devices described. In another embodiment, the integrated phone-based home gateway interface 80, 100' includes only selected ones of the access and monitoring devices described.

In one embodiment, the secure wireless access point 210 includes all of the access and monitoring devices described. In another embodiment, the secure wireless access point 210 includes only selected ones of the access and monitoring devices described.

Home Energy Management

The integrated phone-based home gateway interface 80, 100' and secure wireless access point 210 is used to provide automatic provisioning and configuration for broadband and narrow band communications for home energy management devices.

In one embodiment, the integrated phone-based home gateway interface 100' includes all of the home energy management devices described. In another embodiment, the integrated phone-based home gateway interface 80, 100' includes only selected ones of the home energy management devices described.

In one embodiment, the secure wireless access point 210 includes all of the home energy management devices described. In another embodiment, the secure wireless access point 210 includes only selected ones of the home energy management devices described.

The home energy management devices include heating, cooling, ventilation and air conditioning (HVAC) devices, solar panels, solar water heaters, wind energy devices and other home energy management devices.

The integrated phone-based home gateway interface 80, 100' and secure wireless access point 210 is used to provide automatic provisioning and configuration for broadband and narrow band communications for home energy management devices. The devices 80, 100' and 210 are also used to access to communications networks 22, 24, and local piconets and local wireless networks 70, 86, 94 for local and remote access to the home energy management devices.

In one embodiment, the integrated phone-based home gateway interface 80, 100' includes display screen 40 and video camera 54 for providing video data for home security, home entertainment and home energy management devices. In another embodiment, the integrated phone-based home gateway interface 80, 100' includes display screen 40 and does not include video camera 54. In another embodiment, the integrated phone-based home gateway interface 80, 100' includes video camera 54 and does not include display screen 40.

In one embodiment, the display screen 40 is a removable module that can be used as portable wireless hand-held device (e.g., infra-red, Bluetooth, RF piconet access, etc.) in the vicinity of the integrated phone-based home gateway interface 80, 100' to provide information from home entertainment, home security and/or home energy management devices.

Figure 20:
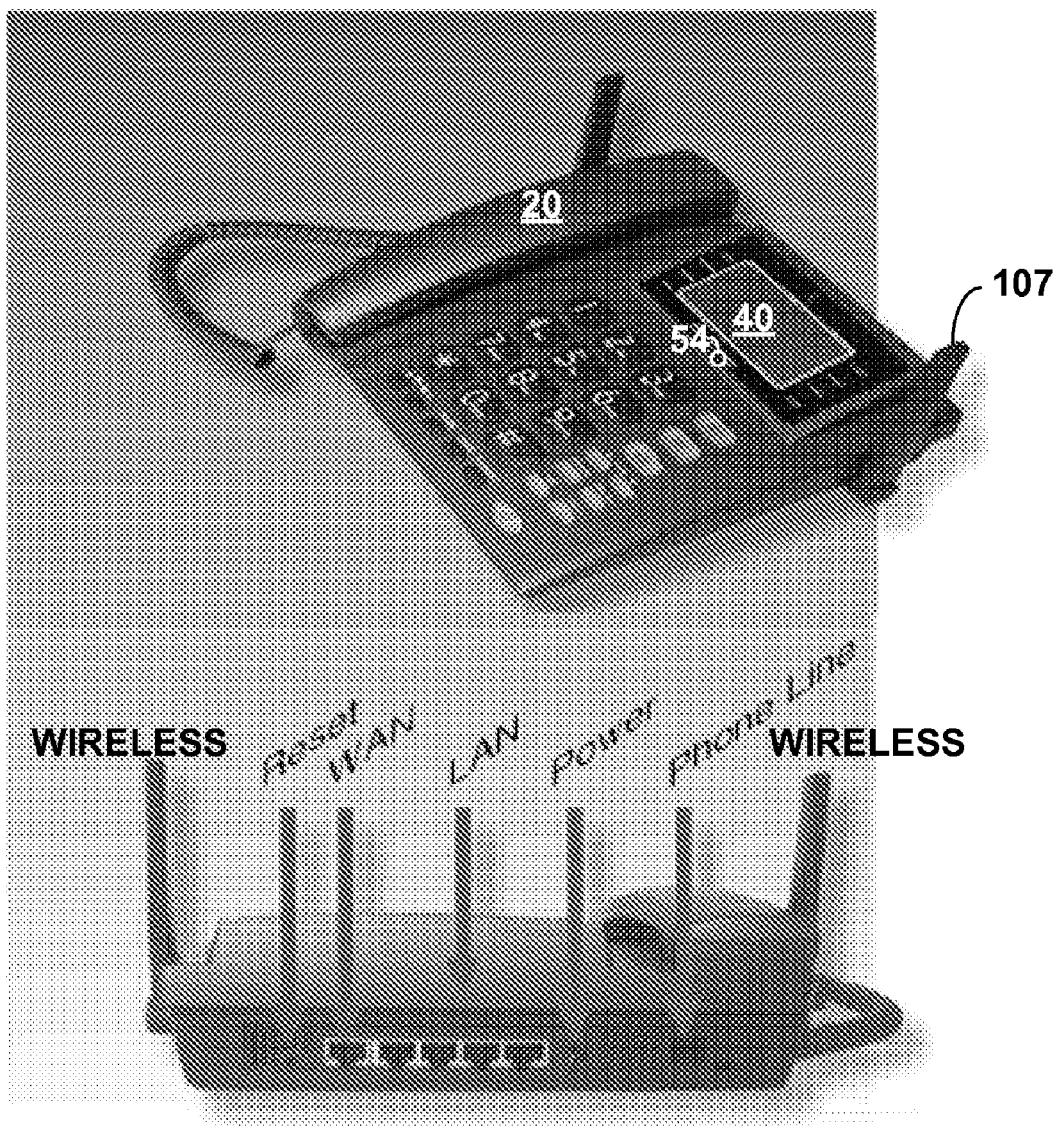
FIG. 20 is a block diagram illustrating a digital photograph of an integrated phone-based home gateway interface.

FIG. 20 is a block diagram 246 illustrating a digital photograph of the integrated phone-based home gateway system 18, 36, 80, 100'.

The broadband communications access devices described herein includes provides secure wired and wireless broadband and narrow band communications access for home entertainment, home security and home energy management devices.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. An integrated phone-based home gateway system, comprising in combination:
    a home gateway interface with one or more processors for initializing wireless and wired broadband communications for home energy management, home security and home entertainment devices in a home environment, for providing gateway, routing and bridging for wireless and wired broadband networking communications and for automatic service provisioning for allocating, configuring and maintaining multiple transmission channels and virtual communications paths used for wired and wireless broadband communications,
    wherein initializing wireless and wired broadband communications includes initializing automatically wired and wireless broadband communications service configurations and provisions from the home gateway interface and initializing automatically one or more gateway, routing and bridging tables on the home gateway interface, and
    wherein the home gateway interface further includes an automatic provisioning manager module for automatic service provisioning for wired and wireless broadband communications wherein the automatic provisioning manager module includes automatically initializing wired and wireless broadband communications service configurations and provisions and automatically establishing one or more wired and wireless broadband communications channels and one or more wired and wireless broadband virtual communications paths;
    a wired communications interface for connecting to external wired devices, for connecting to one or more wired broadband communications networks and for providing wired broadband communications for the home energy management, home security and home entertainment devices;
    a wireless communications interface for connecting to external wireless devices, for connecting to one or more wireless broadband communications networks, for providing wireless broadband communications for the home energy management, home security and home entertainment devices;
    a security interface for providing secure wired and wireless communications for the home energy management, home security and home entertainment devices;
    a removable display screen with a wireless interface for providing display information for the home energy management, home security and home entertainment devices, wherein the removable display screen can be used as a portable wireless hand-held device in the vicinity of the integrated phone-based home gateway system for remote monitoring; and
    an integral video camera for providing video information for the home energy management, home security and home entertainment devices.

2. The integrated phone-based home gateway system of claim 1 wherein the home energy management devices include heating, cooling, ventilation and air conditioning (HVAC) devices, solar panels, solar water heaters, wind energy devices.

3. The integrated phone-based home gateway system of claim 1 wherein the home security devices include alarm systems and home video monitoring systems.

4. The integrated phone-based home gateway system of claim 3 wherein the alarm systems include motion detectors, smoke detectors, carbon monoxide (CO) and carbon dioxide ($CO_2$) detectors, fire detectors, pool fall in detectors and home medical emergency detectors.

5. The integrated phone-based home gateway system of claim 1 wherein the home security devices include electronic access control devices for controlling access to a home environment.

6. The integrated phone-based home gateway system of claim 5 wherein the electronic access control devices include biometric readers comprising fingerprint readers, facial recognition readers and iris scan readers.

7. The integrated phone-based home gateway system of claim 1 wherein the home security devices include monitoring devices for Nuclear, Biological and Chemical (NBC) agents to detect terrorist attacks.

8. The integrated phone-based home gateway system of claim 1 wherein the home entertainment devices include portable hand held game playing devices, hand held audio/video devices, mobile phones, non-portable game playing devices, set-top boxes, video-on-demand (VoD) devices, digital video recorders (DVR), digital video disc (DVD) and home cinema systems.

9. The integrated phone-based home gateway system of claim 1 wherein the wireless communications interface includes a 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home", Bluetooth and infrared wireless interfaces.

10. The integrated phone-based home gateway system of claim 1 further comprising an X10 module, wherein the X10 module is used for communications between wireless transmitters and receivers by sending and receiving signals over existing alternating current (AC) power line wiring.

11. The integrated phone-based home gateway system of claim 1 wherein the integrated phone-based home gateway system allows local and remote interactions with home energy management, home security and home entertainment devices via one or more different types of communications networks.

12. The integrated phone-based home gateway system of claim 1 further comprising a Power over the Ethernet ("PoE") power module to provide power for the integrated phone-based home gateway system.

13. An integrated phone-based home gateway system, comprising in combination:
    means for providing a home gateway interface with one or more processors for a home environment for home energy management, home security and home entertainment devices, wherein
    the home gateway interface provides a means for initializing wireless and wired broadband communications, for providing gateway, routing and bridging for wireless and wired broadband networking communications and for automatic service provisioning for allocating, configuring and maintaining multiple transmission channels and virtual communications paths used for wired and wireless broadband communications,
    wherein initializing wireless and wired broadband communications includes initializing automatically wired and wireless broadband communications service configurations and provisions from the home gateway interface and initializing automatically one or more gateway, routing and bridging tables on the home gateway interface, and
    wherein the home gateway interface further includes an automatic provisioning manager module for automatic service provisioning for wired and wireless broadband communications wherein the automatic provisioning manager module includes automatically initializing wired and wireless broadband communications service configurations and provisions and automatically establishing one or more wired and wireless broadband communications channels and one or more wired and wireless broadband virtual communications paths;
    means for providing secure wireless communications for home energy management, home security and home entertainment devices;
    means for providing secure wired communications for home energy management, home security and home entertainment devices;
    means for providing a security interface for providing secure wired and wireless communications for the home energy management, home security and home entertainment devices;
    means for providing a removable display screen with a wireless interface for providing display information for the home energy management, home security and home entertainment devices, wherein the removable display screen can be used as a portable wireless hand-held device in the vicinity of the integrated phone-based home gateway system for remote monitoring; and
    means for providing an integral video camera for providing video information for the home energy management, home security and home entertainment devices.

14. The integrated phone-based home gateway system of claim 13 wherein the home security devices include motion detectors, smoke detectors, carbon monoxide (CO) and carbon dioxide ($CO_2$) detectors, fire detectors, pool fall in detectors, home medical emergency detectors, biometric readers comprising fingerprint readers, facial recognition readers and iris scan readers and monitoring devices for Nuclear, Biological and Chemical (NBC) agents to detect terrorist attacks.

15. The integrated phone-based home gateway system of claim 13 wherein the home entertainment devices include portable hand held game playing devices, hand held audio/video devices, mobile phones, non-portable game playing devices, set-top boxes, video-on-demand (VoD) devices, digital video recorders (DVR), digital video disc (DVD) and home cinema systems.

16. The integrated phone-based home gateway system of claim 13 wherein the home energy management devices include heating, cooling, ventilation and air conditioning (HVAC) devices, solar panels, solar water heaters and wind energy devices.

17. The integrated phone-based home gateway system of claim 13 wherein the secure wireless communications includes a secure 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home", Bluetooth and infrared wireless communications.

* * * * *